(12) United States Patent
Tsukamoto et al.

(10) Patent No.: US 7,770,963 B2
(45) Date of Patent: Aug. 10, 2010

(54) CAB STRUCTURE FOR CONSTRUCTION MACHINE

(75) Inventors: Daisuke Tsukamoto, Hirakata (JP); Koudou Tsuji, Hirakata (JP)

(73) Assignee: Komatsu Ltd., Tokyo (JP)

( * ) Notice: Subject to any disclaimer, the term of this patent is extended or adjusted under 35 U.S.C. 154(b) by 39 days.

(21) Appl. No.: 11/995,850

(22) PCT Filed: Jul. 13, 2006

(86) PCT No.: PCT/JP2006/313930
§ 371 (c)(1),
(2), (4) Date: Jan. 16, 2008

(87) PCT Pub. No.: WO2007/010807
PCT Pub. Date: Jan. 25, 2007

(65) Prior Publication Data
US 2009/0127888 A1    May 21, 2009

(30) Foreign Application Priority Data
Jul. 19, 2005   (JP)   ............... 2005-208252
Sep. 6, 2005    (JP)   ............... 2005-258523

(51) Int. Cl.
*B62D 33/06* (2006.01)
(52) U.S. Cl. ............................................. 296/190.08
(58) Field of Classification Search ............. 296/190.08
See application file for complete search history.

(56) References Cited

U.S. PATENT DOCUMENTS

| | | | |
|---|---|---|---|
| 5,820,199 A * | 10/1998 | Camplin et al. ............. 296/102 |
| 6,155,632 A | 12/2000 | Fujimoto | |
| 6,189,955 B1 * | 2/2001 | Fryk et al. ............. 296/190.08 |
| 6,325,449 B1 * | 12/2001 | Sorensen et al. ....... 296/190.08 |
| 6,543,840 B2 * | 4/2003 | Colliar et al. .......... 296/190.08 |
| 6,568,746 B2 * | 5/2003 | Sakyo et al. ........... 296/190.08 |
| 6,582,010 B2 * | 6/2003 | Sakyo et al. ........... 296/190.08 |
| 7,004,533 B2 * | 2/2006 | Arthur et al. .......... 296/190.08 |
| 7,246,846 B2 | 7/2007 | Shioji et al. | |
| 7,290,829 B2 * | 11/2007 | Umemoto et al. ...... 296/190.08 |

FOREIGN PATENT DOCUMENTS

| | | | |
|---|---|---|---|
| JP | 11-200412 A | 7/1999 |
| JP | 3608157 B | 6/2002 |
| JP | 2003-221840 A | 8/2003 |
| JP | 2004-161114 A | 6/2004 |
| JP | 2004-224083 A | 8/2004 |
| JP | 2004-306893 A | 11/2004 |
| JP | 2005-008035 A | 1/2005 |
| KR | 10-2005-0064524 A | 6/2005 |

* cited by examiner

*Primary Examiner*—Dennis H Pedder
(74) *Attorney, Agent, or Firm*—Global IP Counselors

(57) ABSTRACT

A cab structure for a construction machine that includes a plurality of pole members and can ensure the rigidity of the cab structure for a construction machine is provided. The cab structure unit includes the rear-right pole member that has a length that is shorter than other pole member (rear-left pole member) and does not reach the level of a floor panel (joint panel) so that the recessed space is formed in the rear side of the cab (10). The rear-right pole member is joined to the first rear panel portion and the plate-shaped member as a reinforcement member that reinforces a part from the lower end of the rear-right pole member to the height position of the floor panel.

12 Claims, 18 Drawing Sheets

CAB STRUCTURE FOR CONSTRUCTION MACHINE

CROSS-REFERENCE TO RELATED APPLICATIONS

This U.S. National stage application claims priority under 35 U.S.C. §119(a) to Japanese Patent Application No. 2005-208252, filed in Japan on Jul. 19, 2005, and Japanese Patent Application No. 2005-208253, filed in Japan on Sep. 6, 2005. The entire contents of Japanese Patent Application Nos. 2005-208252 and 2005-258523 are hereby incorporated herein by reference.

TECHNICAL FIELD

The present invention relates to, in a construction machine that includes an upper revolving unit on a lower traveling unit, an operator compartment (cab) structure that is mounted on the upper revolving unit.

BACKGROUND ART

In the field of civil engineering works that excavates earth, stone and so on, construction machines such as a hydraulic excavator (excavator) have been used in works.

This type of hydraulic excavator mainly includes a lower traveling unit, an upper revolving unit that is revolvably mounted to the lower traveling unit, and an operator compartment (cab) that is fixedly arranged on the upper revolving unit and accommodates an operator.

For example, Japanese Patent Laid-Open Publication TOKUKAI No. 2004-306893 published on Nov. 4, 2004) discloses a cab structure that is deviated from the revolving center of an upper revolving unit that is arranged on the lower traveling unit, and that includes a slide door that is disposed on the exterior side surface and is formed in a curved surface that bulges outward. The cab structure can ensure roll-over (toppling) measures strength at low manufacturing cost. Japanese Patent Laid-Open Publication TOKUKAI No. 2004-224083 and Japanese Patent Laid-Open Publication TOKUKAI No. HEI 11-200412 also disclose known cab structures for construction machine.

SUMMARY OF THE INVENTION

However, the aforementioned known cab structure for construction machine has the following problems.

That is, in the cab structure for a construction machine disclosed in the above mentioned references, since, of four pole members (supports), a mount portion corresponding to a pole member shorter than other pole members is arranged at a position higher than other mount portions (see FIG. 3 in Japanese Patent Laid-Open Publication TOKUKAI No. 2004-306893), even the short pole member can be directly jointed to the mount portion. But, in the cab structure that includes the pole member shorter than other pole members, in the case where all the mount portions are arranged at the same level, the rigidity of the cab will largely decrease.

It is an object of the present invention is to provide a cab structure for a construction machine that includes a plurality of pole members and can ensure the rigidity of the cab structure.

A cab structure for a construction machine according to a first aspect of the present invention is arranged on an upper revolving unit that is mounted to a lower traveling unit, and includes a plurality of pole members, a floor frame, a mount portion and a reinforcement member. The plurality of pole members are substantially arranged along a vertical direction. The length of at least one pole member of the plurality of pole members does not reach the height of the level same as the floor frame. The floor frame is substantially arranged along a horizontal plane and composes a part of a floor of the cab. The mount portion supports the floor frame at a plurality of points. The reinforcement member couples a first pole member included in the plurality of pole members and the floor frame to each other. A length of the first pole member does not reach a height of a level same as the floor frame.

In this configuration, in the cab structure that includes, of a plurality of pole members that are arranged at four corners of a cab, a short pole member (first pole member) shorter than other pole members does not reach the level of the floor frame, the aforementioned short pole member and the floor frame are coupled by the reinforcement member.

Generally, in a cab that is arranged on an upper revolving unit that is mounted to a lower traveling unit of a construction machine, pole members are arranged at four corners of the cab, and compose a framework portion in combination with beam members and the like. In the thus-configured cab, a plurality of the mount portions are arranged on the upper revolving unit, and a floor panel, a floor frame, and the pole members are arranged on the mount portions so that the upper revolving unit and the cab are joined. In this case, the rigidity of the cab can be improved. However, cabs do not always have a substantially rectangular parallelepiped shape. For example, in the case where a cab has a recessed section that is formed in the rear side or the like of the cab to provide space above an upper revolving unit, the length of a pole member may not reach the level of a floor frame. In this case, if the mount portion corresponding to the pole member shorter than other pole members is arranged at a higher position, although the rigidity of the cab can be prevented from decreasing, the shape of the floor frame is required to be redesigned in a stepped shape.

In the cab structure for a construction machine according to the present invention, although the cab structure includes a pole member that does not reach the level of the floor frame, the pole member shorter than the other pole members and the floor frame are coupled by the reinforcement member.

Thus, even in the case of a cab structure that uses a short pole member that does not reach the level of the floor frame to form space that accommodates a radiator and the like in the rear side of the cab, for example, the reinforcement member couples the short pole member and floor frames to each other and can reinforce the cab. Consequently, it is possible to provide a cab structure that can provide space in the rear side or the like of the cab without reducing the rigidity of the cab.

Note that an example of a construction machine can be provided by a hydraulic excavator that includes a cab (operator compartment) and various types of construction equipment on an upper revolving unit, for example.

In a cab structure for a construction machine according to a second aspect of the present invention in the cab structure for a construction machine according to the first aspect of the present invention, the reinforcement member is a sheet metal member.

In this case, a sheet metal member is used as the reinforcement member that couples the short pole member that does not reach to the height of the same level as the floor frame to the floor frame.

Accordingly, in the case where the reinforcement member is arranged in the rear side of the cab, for example, desired space can be easily formed in the rear side of the cab by forming the sheet metal member in desired shapes. Also, the reinforcement member with desired strength can be obtained by adjusting the thickness of the sheet metal member. Thus, if the lower end of the pole member that does not reach to the level of the floor frame is spaced away at a long distance from the level of the mount portion, the thickness of the sheet metal member is increased to provide the reinforcement member with sufficient strength.

In a cab structure for a construction machine according to a third aspect of the present invention in the cab structure for a construction machine according to the first or second aspect of the present invention, the reinforcement member is arranged in a rear side of the cab structure and has a recessed portion that is recessed inward.

In this configuration, the reinforcement member that is arranged in the rear side of the cab is provided with the recessed portion that is recessed inward of the cab.

Accordingly, for example, space that accommodates a radiator and the like can be provided in the rear side of the cab. Consequently, even in the case where space above the upper revolving unit is small and the cab necessarily has required space but is formed in the minimum size, since the recessed portion is arranged at the rear side of a seat in the cab on which the operator sits, the cab occupies only small space above the upper revolving unit. Therefore, the space above the upper revolving unit can be effectively used.

In a cab structure for a construction machine according to a fourth aspect of the present invention in the cab structure for a construction machine according to any of the first to third aspects of the present invention, at least one pole member included in the plurality of pole members is composed of a pipe member.

In this configuration, at least one of the plurality of pole members is composed of a pipe member.

Accordingly, for example, as compared with pole members that are composed of combined sheet metal members, it is possible to largely improve the rigidity of the cab.

In a cab structure for a construction machine according to a fifth aspect of the present invention in the cab structure for a construction machine according to the first aspect of the present invention, the reinforcement member includes a plate-shaped member that is arranged in a rear side of the cab structure and has a recessed portion that is recessed inward, and a plate-shaped member that is arranged on a side surface side of the cab structure.

In this configuration, the plate-shaped members are used in the rear side and side surface side of the cab used as the reinforcement member.

Accordingly, even in a cab structure that includes the pole member that does not reach the level of the floor frame, since the first pole member and the floor frame are coupled by the both members, it is possible to provide a cab structure with sufficient strength.

In a cab structure for a construction machine according to a sixth aspect of the present invention in the cab structure for a construction machine according to the first aspect of the present invention, the cab structure includes a frame member, and an outside accommodation space formation portion, and an inside accommodation space formation portion. The frame member includes the floor frame and the pole members, and forms compartment space where an operator is accommodated inside the frame member The outside accommodation space formation portion is laterally spaced away from the first pole member and is arranged in a rear side of the frame member. The outside accommodation space formation portion has a bent shape in that a lower section of the outside accommodation space formation portion is recessed frontward from the rear side of the frame member so that outside accommodation space is formed in a lower part of the rear side of the frame member. The inside accommodation space formation portion forms inside accommodation space that is arranged between the first pole member and the outside accommodation space and communicates to the compartment space. In addition to this, the inside accommodation space formation portion includes a rear plate-shape section, and a side plate-shaped section. The rear plate-shape section is arranged in an upright position on the floor frame and is joined to the second pole member to close the rear side of the inside accommodation space. The side plate-shaped section is arranged in an upright position on the floor frame and is connected to the rear plate-shaped section that is joined to the first pole member to serve as a partition between the inside accommodation space and the outside accommodation space.

In this cab structure for a construction machine, the inside accommodation space is formed at the side of the first pole member, and the outside accommodation space is formed at the side of the inside accommodation space. The inside accommodation space communicates to the compartment space, and is divided from the outside by the first pole member, the inside accommodation space formation portion and the floor frame. In addition to this, the outside accommodation space is formed in the lower part of the rear side of the frame member to be recessed frontward, and communicates to the outside of the cab. This configuration allows the inside accommodation space to accommodate a device such as electrical equipment that is necessarily protected from wind and weather, and allows the out accommodation space to accommodate a device such as a radiator that is relatively less necessarily protected from wind and weather, therefore, devices can be appropriately accommodated in limited space.

Also, the inside accommodation space formation portion that forms the inside accommodation space has the side plate-shaped section and the rear plate-shaped section that are connected to each other. In addition to this, this inside accommodation space formation portion is arranged in an upright position on the floor frame, and is joined to the first pole member. Thus, the inside accommodation space formation portion can support a load that is applied to the first pole member. That is, the inside accommodation space formation portion serves as a dividing member that divides the outside accommodation space and the inside accommodation space from each other, and can serve as a reinforcement member for the first pole member.

As stated above, in the thus-configured cab structure for a construction machine, the inside accommodation space formation portion reinforces the first pole member to ensure the rigidity of the cab structure, and additionally the inside accommodation space formation portion and the outside accommodation space formation portion can provide accommodation space parts suitable for the types of devices.

In a cab structure for a construction machine according to a seventh aspect of the present invention in the cab structure for a construction machine according to the sixth aspect of the present invention, the frame member further includes a second pole member that is arranged along an edge of the rear side of the frame member on the side opposite to the second pole member, a bar member that couples the first pole member and the second pole member to each other. In addition to this, an upper edge portion of the rear plate-shaped section is joined to the bar member.

In this cab structure for a construction machine, the upper edge portion of the rear plate-shaped section is joined to the bar member that couples the first pole member and the second pole member to each other. Therefore, in this cab structure for a construction machine, it is possible to ensure higher rigidity.

A cab structure for a construction machine according to an eighth aspect of the present invention in the cab structure for a construction machine according to the sixth or seventh aspect of the present invention further includes a cover member that is arranged from the first pole member to the side plate-shaped section to cover a front side of the inside accommodation space.

In this cab structure for a construction machine, the front of the inside accommodation space is closed by the cover member. Therefore, it is possible to prevent exposure of a device that is accommodated in the inside accommodation space to the compartment space. Also, since the cover member is arranged from the first pole member to the side plate-shaped section, the cover member can support a load that is applied to the first pole member. Therefore, in this cab structure for a construction machine, it is possible to ensure higher rigidity.

A cab structure for a construction machine according to a ninth aspect of the present invention in the cab structure for a construction machine according to the eighth aspect of the present invention further includes electrical equipment that is accommodated in the inside accommodation space.

In this cab structure for a construction machine, the electrical equipment is accommodated in the inside accommodation space. Therefore, it is possible to protect the electrical equipment from wind and weather.

A cab structure for a construction machine according to a tenth invention includes a frame member, an outside accommodation space formation portion, and an inside accommodation space formation portion. The frame member includes a floor frame that is arranged as a floor surface, and a plurality of pipe-shaped members that include a first pole member that is arranged in an upright position along one side edge of a rear side of the frame member on the floor frame. The frame member forms compartment space where an operator is accommodated inside the frame member. The outside accommodation space formation portion is laterally spaced away from the first pole member and is arranged in the rear side of the frame member. The outside accommodation space formation portion has a bent shape in that a lower section of the outside accommodation space formation portion is recessed frontward from the rear side of the frame member so that outside accommodation space is formed in a lower part of the rear side of the frame member. The inside accommodation space formation portion forms inside accommodation space that is arranged between the first pole member and the outside accommodation space and communicates to the compartment space. In this configuration, the inside accommodation space formation portion includes a rear plate-shaped section and a side plate-shaped section. The rear plate-shape section is arranged in an upright position on the floor frame, and is joined to the first pole member to cover a rear side of the inside accommodation space. The side plate-shaped section is arranged in an upright position on the floor frame and is connected to the rear plate-shaped section to serve as a partition between the inside accommodation space and the outside accommodation space.

In this cab structure for a construction machine, the inside accommodation space is formed at the side of the first pole member, and the outside accommodation space is formed at the side of the inside accommodation space. The inside accommodation space communicates to the compartment space, and is divided from the outside by the first pole member, the inside accommodation space formation portion and the floor frame. In addition to this, the outside accommodation space is formed in the lower part of the rear side of the frame member to be recessed frontward, and communicate to the outside of the cab. This configuration allows the inside accommodation space to accommodate a device such as electrical equipment that is necessarily protected from wind and weather, and allows the outside accommodation space to accommodate a device such as a radiator that is relatively less necessarily protected from wind and weather, therefore, devices can be appropriately accommodated in limited space.

Also, the inside accommodation space formation portion that forms the inside accommodation space has the side plate-shaped section and the rear plate-shaped section that are connected to each other. In addition to this, this inside accommodation space formation portion is arranged in an upright position on the floor frame, and is joined to the first pole member. Thus, the inside accommodation space formation portion can support a load that is applied to the first pole member. That is, the inside accommodation space formation portion serves as a member that divides the outside accommodation space and the inside accommodation space from each other, and can serve as a reinforcement member for the first pole member.

As stated above, in the thus-configured cab structure for a construction machine, the inside accommodation space formation portion reinforces the first pole member to ensure the rigidity of the cab structure, and additionally the inside accommodation space formation portion and the outside accommodation space formation portion can provide accommodation space parts suitable for the types of devices.

In a cab structure for a construction machine according to an eleventh aspect of the present invention in the cab structure for a construction machine according to the tenth aspect of the present invention, the frame member further includes a second pole member that is arranged along an edge portion of the rear side on a side opposite to the second pole member, a bar member that couples the first pole member and the second pole member to each other. In addition to this, an upper edge portion of the rear plate-shaped section is joined to the bar member.

In this cab structure for a construction machine, the upper end of the rear plate-shaped section is joined to the bar member that couples the first pole member and the second pole member to each other. Therefore, in this cab structure for a construction machine, it is possible to ensure higher rigidity.

A cab structure for a construction machine according to a twelfth aspect of the present invention in the cab structure for a construction machine according to the tenth or eleventh aspect of the present invention further includes a cover member. The cover member is arranged over the first pole member and the side plate-shaped section to close a front side of the inside accommodation space.

In this cab structure for a construction machine, the front of the inside accommodation space is closed by the cover member. Therefore, it is possible to prevent exposure of a device that is accommodated in the inside accommodation space to the compartment space. Also, since the cover member is arranged from the first pole member to the side plate-shaped section, the cover member can support a load that is applied to the first pole member. Therefore, in this cab structure for a construction machine, it is possible to ensure higher rigidity.

A cab structure for a construction machine according to a thirteenth aspect of the present invention in the cab structure for a construction machine according to the tenth or eleventh aspect of the present invention further includes electrical equipment that is accommodated in the inside accommodation space.

In this cab structure for a construction machine, the electrical equipment is accommodated in the inside accommodation space. Therefore, it is possible to protect the electrical equipment from wind and weather.

DETAILED DESCRIPTION OF THE PREFERRED EMBODIMENTS

First Embodiment

With reference to FIGS. 1 through 13, the following description will describe a hydraulic excavator (construction machine) 1 that includes an operator compartment (cab) to which a cab structure for a construction machine according to one embodiment of the present invention is adopted.

Figure 1:
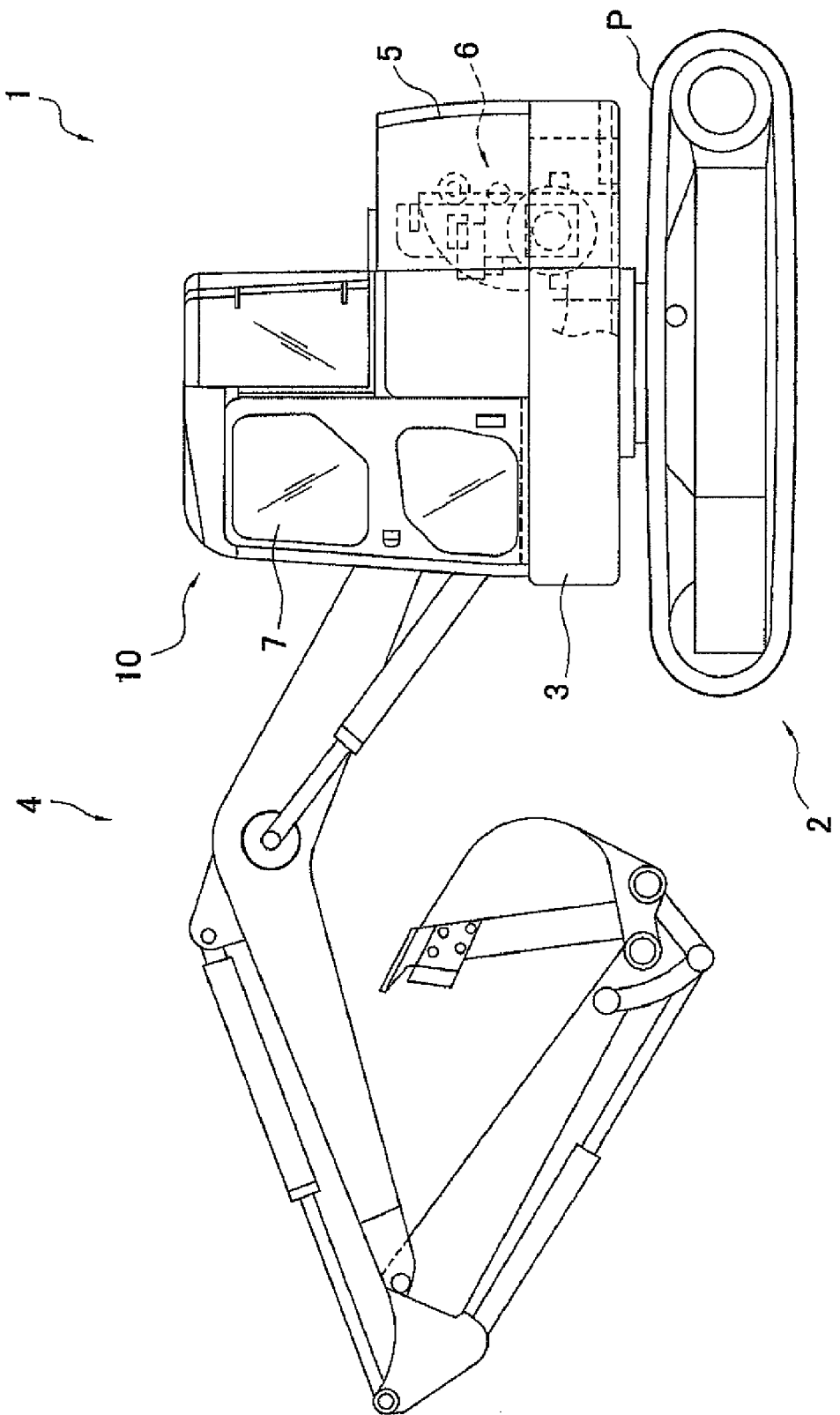
FIG. 1 is a side view of the outline of a hydraulic excavator according to one embodiment of the present invention.

As used herein to describe the present invention, terms "left and right", "front and rear", and "front portion and rear side" should be interpreted as directions relative to an operator when sitting on a seat in a cab 10 (see FIG. 1, for example).

Entire Configuration of Hydraulic Excavator 1

Figure 2:
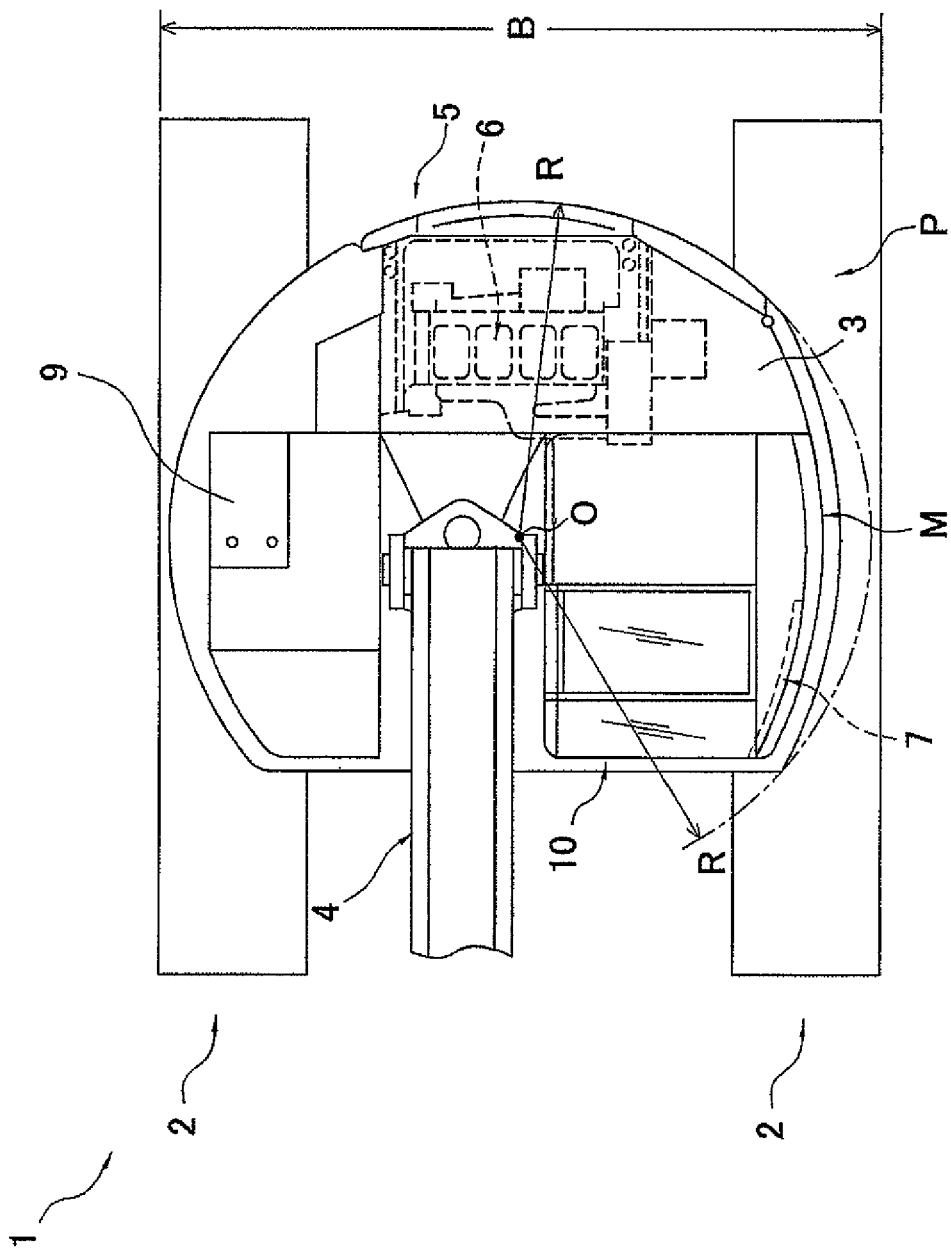
FIG. 2 is a plan view showing the hydraulic excavator shown in FIG. 1.

The hydraulic excavator 1 according to this embodiment includes a lower traveling unit 2, a revolving base (upper revolving unit) 3, a working machine 4, a counterweight 5, an engine 6, an equipment compartment 9, and the cab 10, as shown in FIGS. 1 and 2. The hydraulic excavator 1 is a small rear-swing radius type hydraulic excavator that has the revolving radius R of the machine except the working machine 4 (see FIG. 2) not more than a predetermined value.

The length of the revolving base 3 that protrudes from the lower traveling unit 2 in plan view when the revolving base 3 revolves is not more than 10% of the revolving radius.

The lower traveling unit 2 drives endless belts P that are wounded on the left and right sides of the lower traveling unit 2 relative to the advance direction so that the hydraulic excavator 1 moves frontward and rearward. The revolving base 3 is revolvably mounted on the upper side of the lower traveling unit 2.

The revolving base 3 can revolve in either direction on the lower traveling unit 2. The working machine 4, the counterweight 5, the engine 6, and the cab 10 are mounted on the upper side of the revolving base 3.

The working machine 4 includes a boom, an arm that is mounted to the fore end of the boom, and a bucket that is mounted to the fore end of the arm. The working machine 4 moves the arm, the bucket, and the like upward and downward by means of hydraulic pressure cylinders to excavate earth and stones in the field of civil engineering works.

The counterweight 5 is composed of scrap iron, concrete and the like that are fixed in a box that is composed of steel plates, for example, and is arranged on the rear side of the revolving base 3 to keep the balance of a machine body in an excavation work or the like.

The engine 6 is a power source that powers the lower traveling unit 2 and the working machine 4, and is arranged in proximity to the counterweight 5.

The equipment compartment 9 is arranged at the side of the working machine 4, and accommodates a fuel tank, a hydraulic oil tank, operation valves and the like (not shown).

The cab 10 is an operator compartment of the hydraulic excavator 1 where the operator steps into/off, and is arranged on the front-left side of the revolving base 3 at the side of the working machine 4 to provide a clear sight line to the fore end of the working machine 4 for the operator. The cab configuration of the cab 10 will be described later.

Configuration of Cab 10

Figure 3:
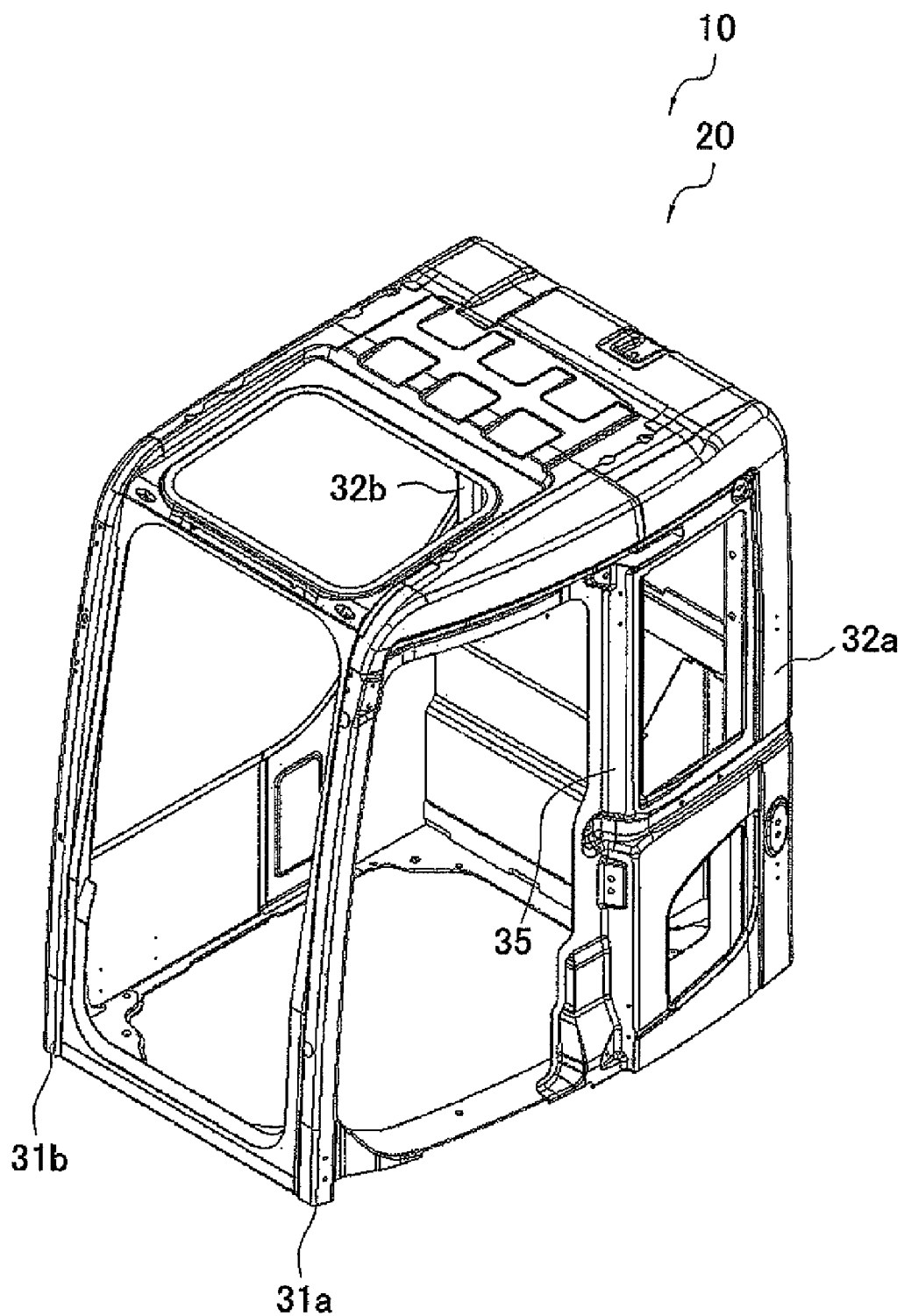
FIG. 3 is a perspective view showing a cab structure that is installed on the hydraulic excavator shown in FIG. 1.

The cab 10 is a box-shaped structure that includes pole members 31a, 31b, 32a and 35, and the like as shown in FIG. 3. As shown in FIG. 2, a central part M (hereinafter, referred to as an arc part) of the side portion on the left side of the cab 10 has an arc shape (round shape) that bulges to extend substantially along a circle with a radius R that centers the revolving center O of the revolving base 3. Accordingly, the hydraulic excavator 1 can be a small rear-swing radius type hydraulic excavator that includes the revolving base 3 is prevented from largely protruding outward of the lower traveling unit 2 even in revolving operation, and therefore the hydraulic excavator 1 can be operated even in narrow space in the case of roadwork or the like. In addition, a slide door 7 is mounted on the arc part so that the operator steps into/off the cab 10. Thus, even when the slide door 7 is opened, the slide door 7 can be prevented from protruding outward of the revolving radius R of the revolving base 3. Consequently, it is possible to maximize the interior capacity of the cab 10 without interference of the cab 10 that protrudes from the machine body width B (see FIG. 2) with a fixed structure or the like in proximity to the cab 10.

Figure 4:
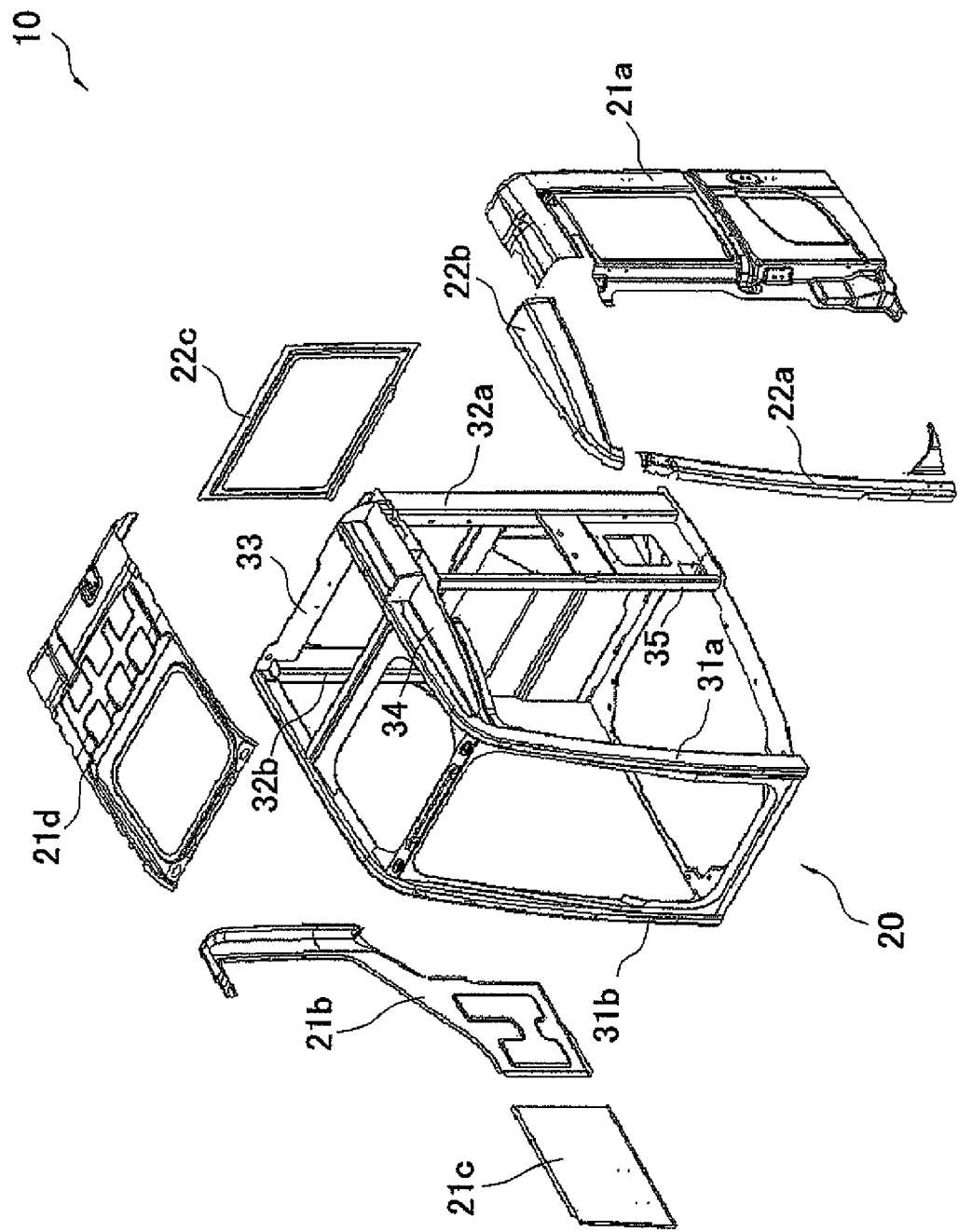
FIG. 4 is an exploded perspective view showing the configuration of the cab shown in FIG. 3.

Also, as shown in FIG. 4, in the cab 10, side panels 21a, 21b and 21c, a roof panel 21d, side frames 22a and 22b, and a rear frame 22c are mounted to a cab structure unit 20 (discussed later). Note that glass (not shown) is fitted into window frames that are formed by the panels 21a to 21d and the frames 22a to 22c. Thus, space that accommodates the operator is formed in the cab 10.

The side panel 21a and the side frames 22a and 22b that are mounted on the left side surface of the cab 10 are mounted to a part of the cab structure unit 20 that has the aforementioned arc shape that lies on the left side surface of the cab 10. For this reason, the side panel 21a and the side frames 22a and 22b has a shape that bulges radially of a circle that centers the revolving center O.

Figure 5:
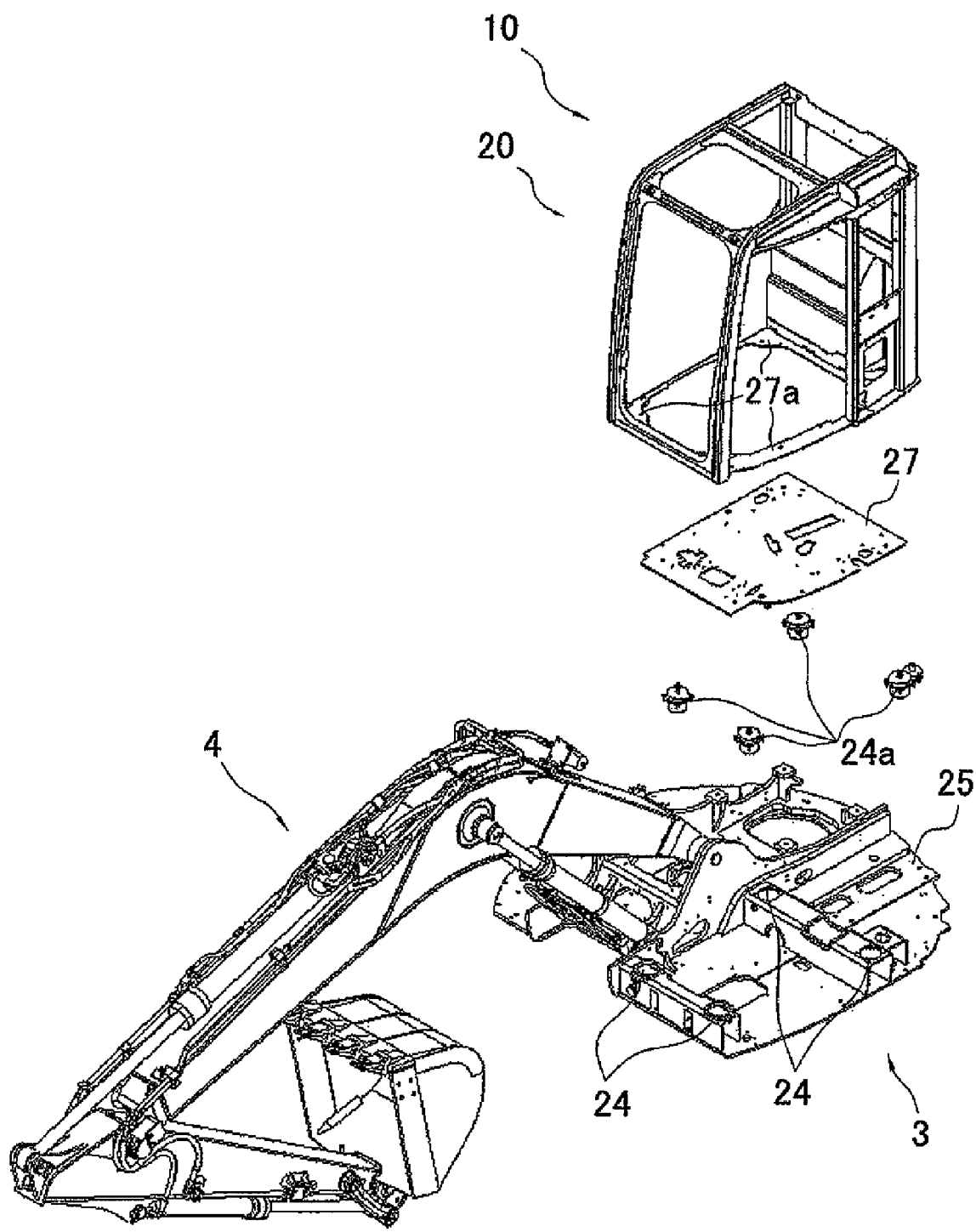
FIG. 5 is a view showing mounting arrangement of the cab shown in FIG. 3 onto a revolving base.

Also, as shown in FIG. 5, the cab 10 is installed on four mount portions 24 that are formed in the front-left side of the revolving frame 25 as the upper portion of the revolving base 3 with vibration isolators 24a and a floor panel 27 being fastened on a floor frame 27a of the cab 10 by bolts (not shown). Thus, the cab 10 is supported on the revolving base 3 (revolving frame 25) at the four points.

Also, the cab 10 includes the cab structure unit 20 that serves as a framework portion. Members that compose the cab structure unit 20 will be described later, specifically.

Configuration of Cab Structure Unit 20

In the hydraulic excavator 1 according to this embodiment, the framework portion that composes the cab 10 is composed of a plurality of pole members and beam members in combination with each other.

Figure 6:
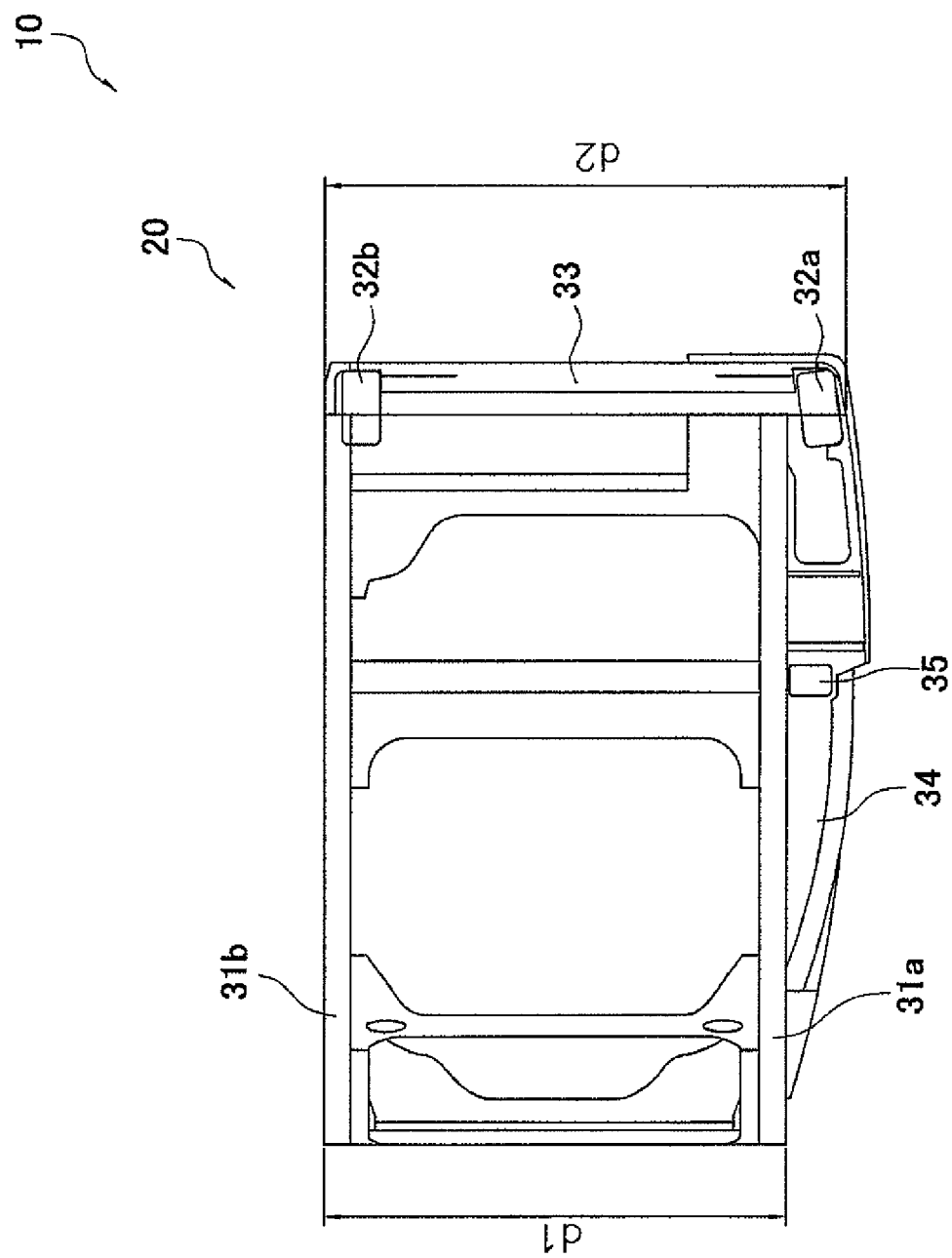
FIG. 6 is a plan view showing the configuration of the cab shown in FIG. 3.

Specifically, as shown in FIGS. 4 and 6, the cab structure unit 20 includes a front-left pole member (pole member) 31a, a front-right pole member (pole member) 31b, a rear-left pole member (pole member, and second pole member) 32a, a rear-right pole member (pole member, and first pole member) 32b, a rear beam member (first joint member) 33, a side beam member (second joint member) 34, and a support pole (third pole member) 35.

Of the aforementioned members, the pole members 31a, 31b, 32a and 32b that are arranged at four of front-left, front-right, rear-left and rear-right corners of the cab structure unit 20 are composed of a pipe member. Accordingly, as compared with a conventional cab structure unit that is composed of combined sheet metal members, it is possible to largely improve the rigidity of the cab. Also, the front-left pole member 31a has a rectangular shape in section, and the front-right pole member 31b has a deformed shape in section to receive the window glass fitted thereto.

Figure 7:
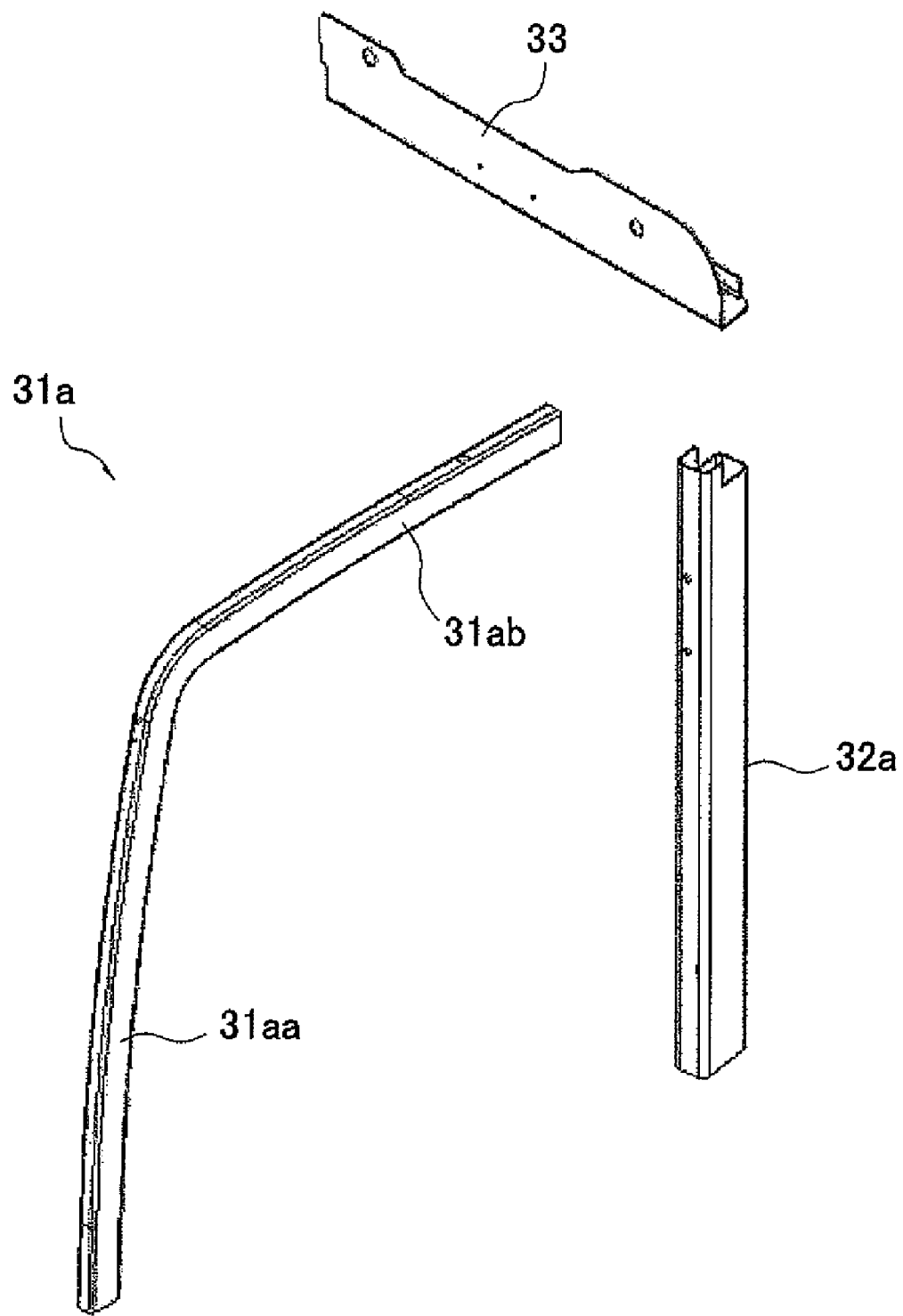
FIG. 7 is an exploded perspective view showing the configuration of pole members and the like that compose the skeletal outline of the cab shown in FIG. 3.

As shown in FIG. 7, the front-left pole member 31a is composed of a pipe member that is bent in proximity to the middle part of the pipe member, and includes a pole portion 31aa that is substantially arranged along the vertical direction, and a beam portion 31ab that is substantially arranged along the horizontal direction. Since one pipe member is thus bent to form the pole portion 31aa and the beam portion 31ab, it is possible to reduce the number of parts and additionally to provide the cab structure unit 20 with high rigidity. Note that the same goes for the front-right pole member 31b.

As shown in FIG. 7, the rear-left pole member 32a is composed of one pipe member, and is substantially arranged along the vertical direction. Also, a cut-off portion is formed at the upper end of the rear-left pole member 32a to fit with the shape of the rear beam member 33 to be joined to the rear-left pole member 32a. The cut-off portion is joined to the side surface of the rear beam member 33. In addition, the lower end of the rear-left pole member 32a is mounted to the floor frame 27a. Also, the floor frame 27a is mounted at parts that are located substantially right above the aforementioned mount portions 24 together with the floor panel 27 through the vibration isolators 24a.

Similarly to the rear-left pole member 32a, the rear-right pole member 32b is composed of one pipe member, and is substantially arranged along the vertical direction. Also, a cut-off portion is formed at the upper end of the rear-right pole member 32b to fit with the shape of the rear beam member 33 to be joined to the rear-right pole member 32b, and the cut-off portion is joined to the side surface of the rear beam member 33. On the other hand, recessed space 40 is formed in the rear side of the cab 10. For this reason, the lower end of the rear-right pole member 32b does not reach the level (height position) of the floor frame 27a. That is, although the rear-right pole member 32b is arranged on the rear edge of the cab structure unit 20 in plan view similarly to the rear-left pole member 32a, since the length of the rear-right pole member 32b is short as compared with the rear-left pole member 32a, the lower end of the rear-right pole member 32b does not reach the floor frame 27a. For this reason, in order to maintain the rigidity of the cab 10, it is necessary to reinforce a portion around the rear-right pole member 32b. The reinforcement structure in the rear side of the cab 10 including the rear-right pole member 32b will be described latter.

Figure 8:
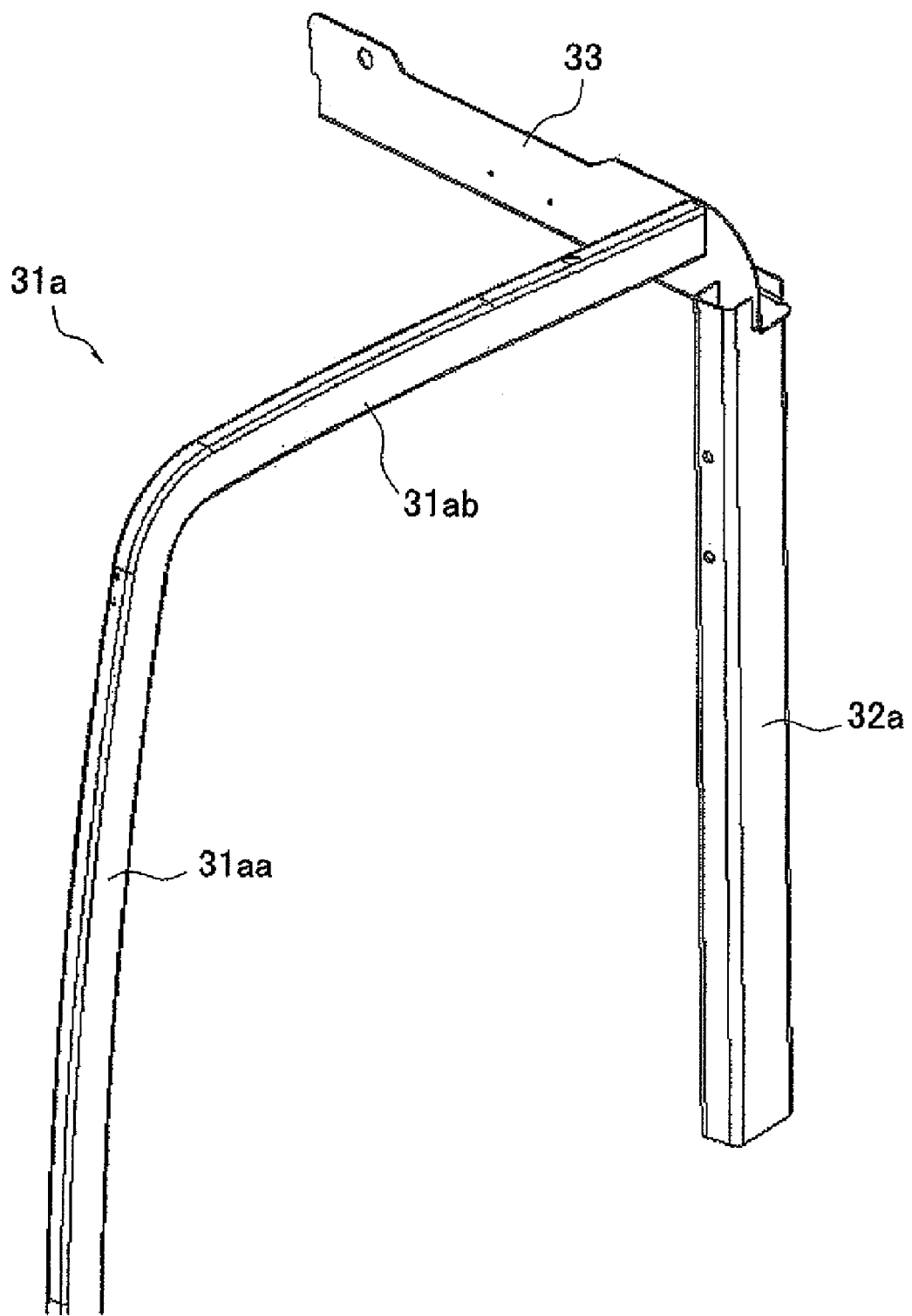
FIG. 8 is a view of the assembled pole members and the like shown in FIG. 7.

As shown in FIG. 7, the rear beam member 33 is composed of a sheet metal member that has a substantially L shape in section. As shown in FIG. 8, the rear beam member 33 couples the rear ends portion of the respective beam portions 31ab and 31bb of the front-left and front-right pole members 31a and 31b, and the upper ends of the rear-left and rear-right pole members 32a and 32b to each other. More specifically, the rear ends of the beam portions 31ab and 31bb of the front-left and front-right pole members 31a and 31b are joined to the surface of the substantially sectionally L-shaped rear beam member 33 that is substantially parallel to the vertical direction. The upper ends of the rear-left and the rear-right pole members 32a and 32b are joined to the surface of the substantially sectionally L-shaped rear beam member 33 that is substantially parallel to the horizontal direction.

Figure 9:
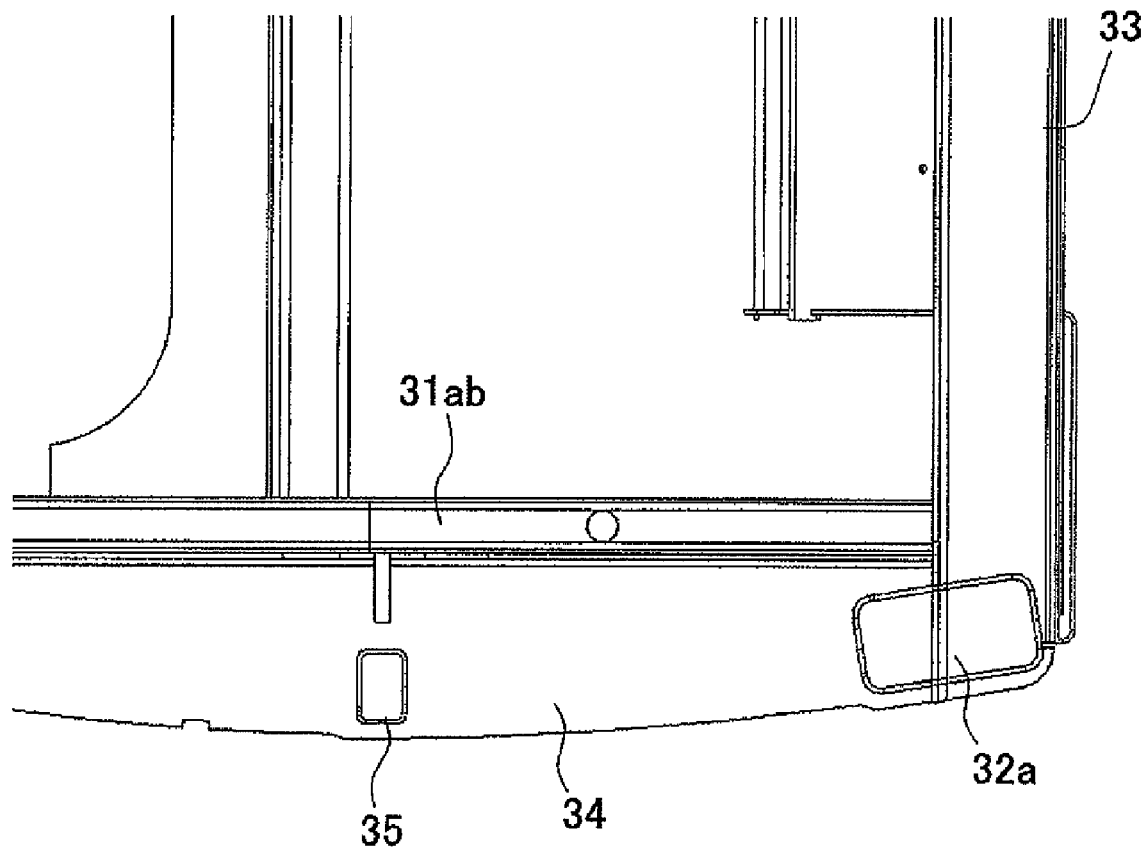
FIG. 9 is an enlarged plan view showing the arrangement of the assembled pole members and the like shown in FIG. 7.

In this configuration, the joint parts of the front-left pole member 31a and the rear-left pole member 32a (the rear end of the beam portion 31ab of the front-left pole member 31a, and the upper end of the rear-left pole member 32a) are arranged at different phase from each other, as shown in FIGS. 8 and 9. This phase difference results from the shape of the cab 10 that includes the arc part on the side part of the cab 10 to compose the aforementioned small rear-swing radius type hydraulic excavator 1. Specifically, in the cab structure unit 20, as shown in FIG. 6, the front-left and front-right pole members 31a and 31b are arranged in parallel to each other, and the pole members 31a, 31b, 32a, and 32b are arranged so that the interval d1 between the front-left and front-right pole members 31a and 31b may differ from the interval d2 between the rear-left and rear-right pole members 31a and 32b. For this reason, in the cab 10, the rear side width is wider than the front side width. As a result, in the case where the front-left and front-right pole members 31a and 31b are arranged in parallel to each other, this causes the phase difference between the joint parts of the front-left and rear-left pole members 31a and 32a that are arranged on the left side including the arc part.

In the hydraulic excavator 1 according to this embodiment, even in the case where the cab 10 is thus configured suitably for small rear-swing radius type hydraulic excavators, the rear beam member 33 that is used as a joint member solves a problem of the phase difference between the joint parts of the pole members 31a and 32a caused by the configuration of the cab suitable for small rear-swing radius type hydraulic excavators.

Figure 10:
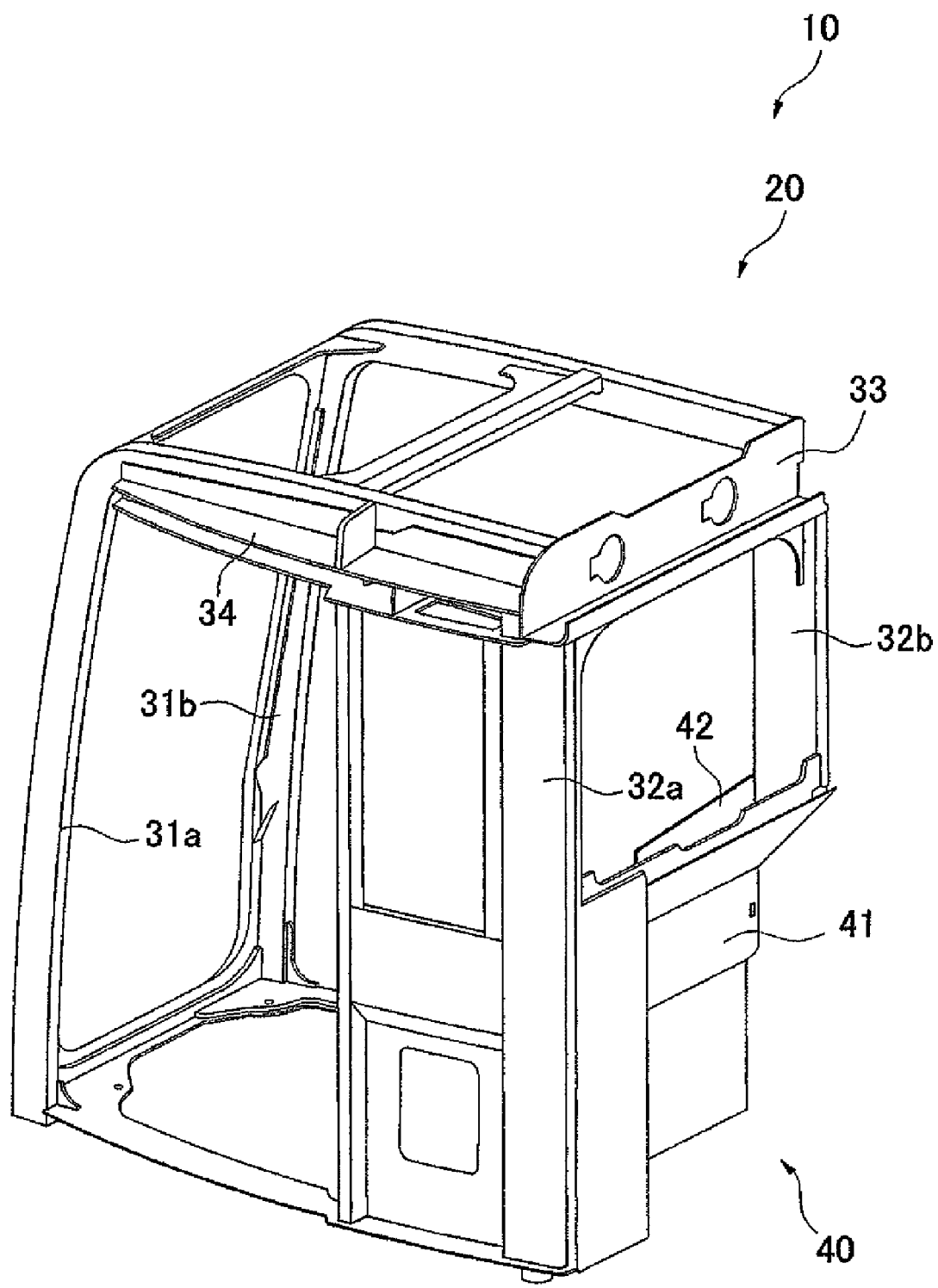
FIG. 10 is a perspective view showing the configuration of the rear side of the cab shown in FIG. 3.

As shown in FIGS. 6, 9 and 10, the side beam member 34 is composed of two substantially L-shaped sheet metal members that are combined with each other in vertical direction, and is mounted along the front-left pole member 31a (the beam portion 31ab) on the left side surface side of the cab 10 including the aforementioned arc part. The side beam member 34 couples the beam portion 31ab of the front-left pole member 31a and the rear-left pole member 32a to each other, and is supported on the upper end of the support pole member 35. Accordingly, the rear end of the beam portion 31ab of the front-left pole member 31a and the upper end of the rear-left pole member 32a that are arranged at different phase from each other can be firmly joined to each other by means of the side beam member 34 together with the rear beam member 33. In addition, since the side beam member 34 is arranged along and above a range where the slide door 7 slides, and a guide and a roller moving part are arranged on the lower surface of the upper substantially L-shaped sheet metal member and on the upper surface of the lower substantially L-shaped sheet metal member, respectively, even if the weight of the slide door 7 is applied to the side beam member 34, it is possible to keep the balance of the cab 10.

The support pole member 35 is substantially arranged along the vertical direction at the middle part between the pole portion 31aa of the front-left pole member 31a and the rear-left pole member 32a on the left side surface including the arc part where the slide door 7 is attached. Therefore, the support pole member 35 can improve the rigidity of the cab 10 as a whole, and additionally can keep the balance of the cab 10 together with the aforementioned side beam member 34 even when the slide door 7 that is attached to the left side surface of the cab 10 slides.

Configuration of Rear Side of Cab 10

In the hydraulic excavator 1 according to this embodiment, the recessed space 40 shown in FIG. 10 is formed in the rear side of the cab 10. The cab 10 is mounted so that the space accommodates a cooling device 50 (see FIGS. 12 and 13) such as a radiator that is arranged on the revolving base 3 (revolving frame 25). Since the shape of the cab 10 is not a perfect rectangular parallelepiped shape, but partially has the recessed space 40, the occupancy area of the cab 10 on the revolving base 3 is increased so that the space on the revolving base 3 can be effectively used. Additionally, it is possible to reduce the revolving base 3 in size.

Figure 11:
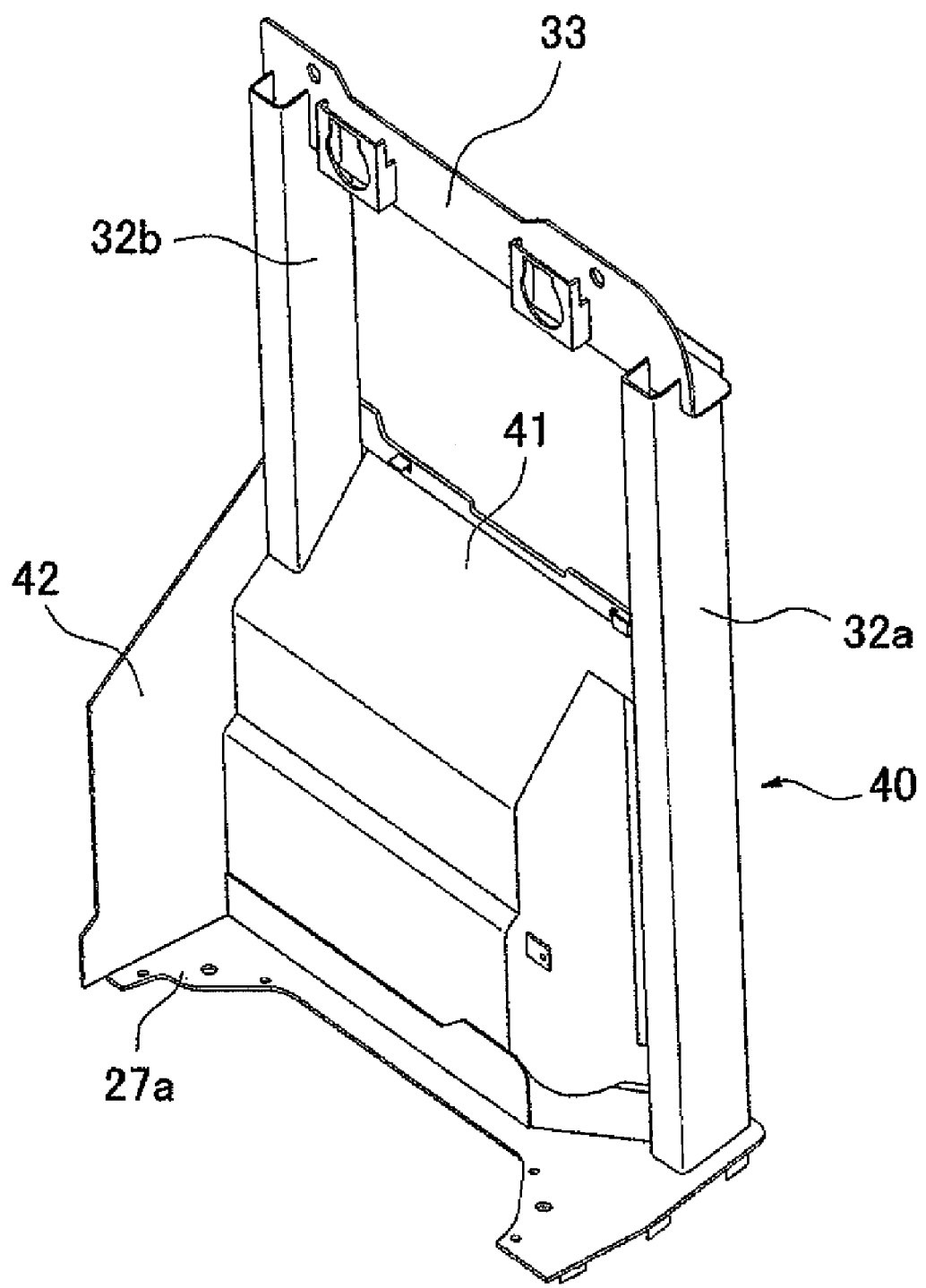
FIG. 11 is a perspective view showing the configuration of assembled members in the rear side of the cab shown in FIG. 3.

As shown in FIG. 11, the recessed space 40 is defined by a first rear panel portion (reinforcement member) 41 and a plate-shaped member (reinforcement member) 42. The first rear panel portion 41 is joined to the rear-left and rear-right pole members 32a and 32b.

The first rear panel portion 41 is formed of a sheet metal member, and is formed in accordance with the size of the recessed space 40. Also, the first rear panel portion 41 is joined to the side surface part of the rear-left pole member 32a, and the lower end of the rear-right pole member 32b.

The plate-shaped member 42 is a sheet metal member that is arranged along the right side surface of the cab 10 to reinforce the joint part in proximity to the rear-right pole member 32b. The plate-shaped member 42 couples the side surface of the rear-right pole member 32b, the side surface of the first rear panel portion 41, and the floor frame 27a that serves as a member to be mounted to the floor panel 27 to each other.

In this configuration, as discussed above, since the aforementioned recessed space 40 is formed, the length of the rear-right pole member 32b does not reach the floor frame 27a. For this reason, in this embodiment, in order to reinforce the strength from the lower end part of the rear-right pole member 32b to the floor frame 27a, the first rear panel portion 41 and the plate-shaped member 42 are mounted. Also, the first rear panel portion 41 and the plate-shaped member 42 are mounted to intersect each other, as shown in FIG. 11.

Figure 12:
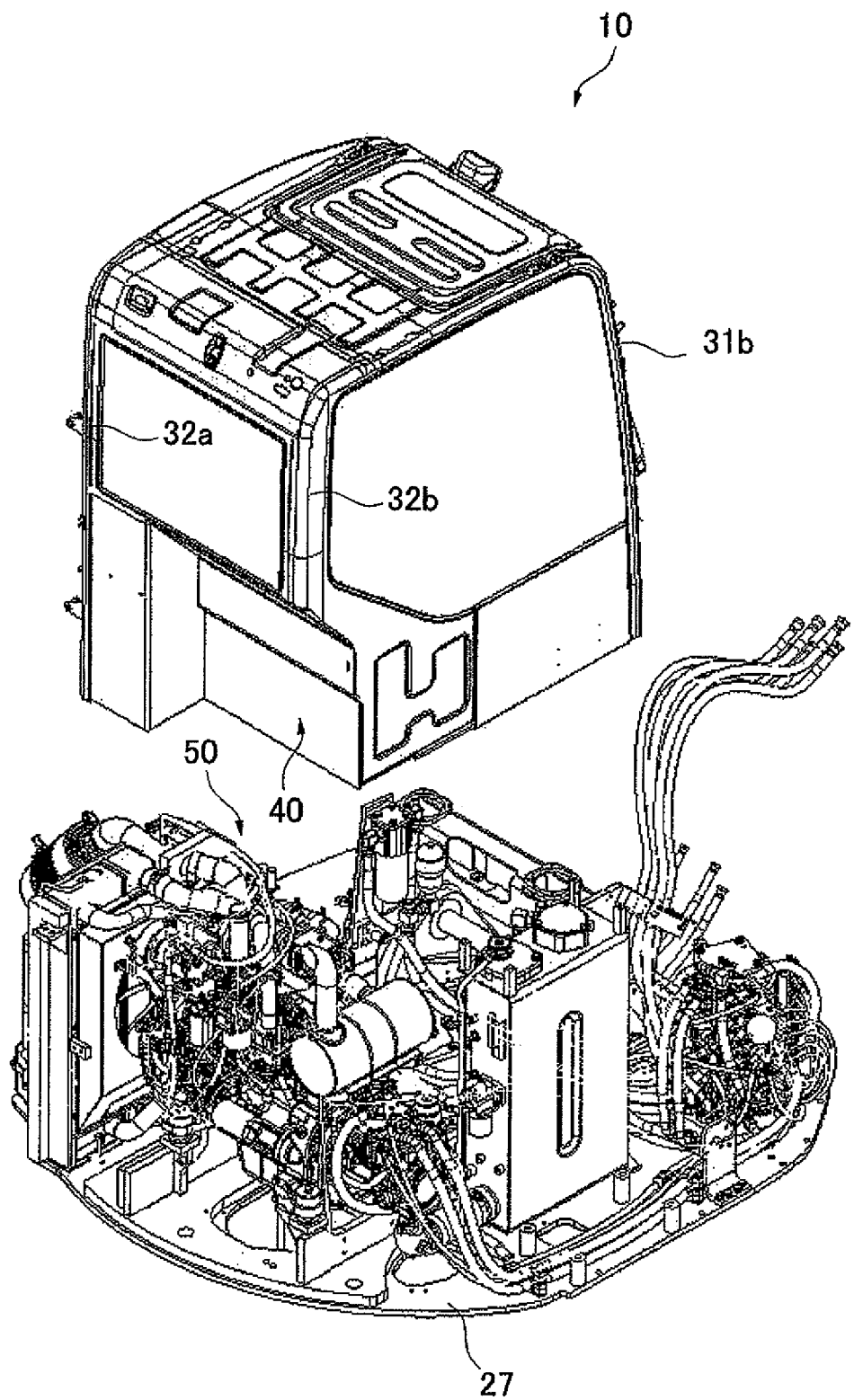
FIG. 12 is a perspective view showing the installation of the cab shown in FIG. 3 onto the revolving base.
Figure 13:
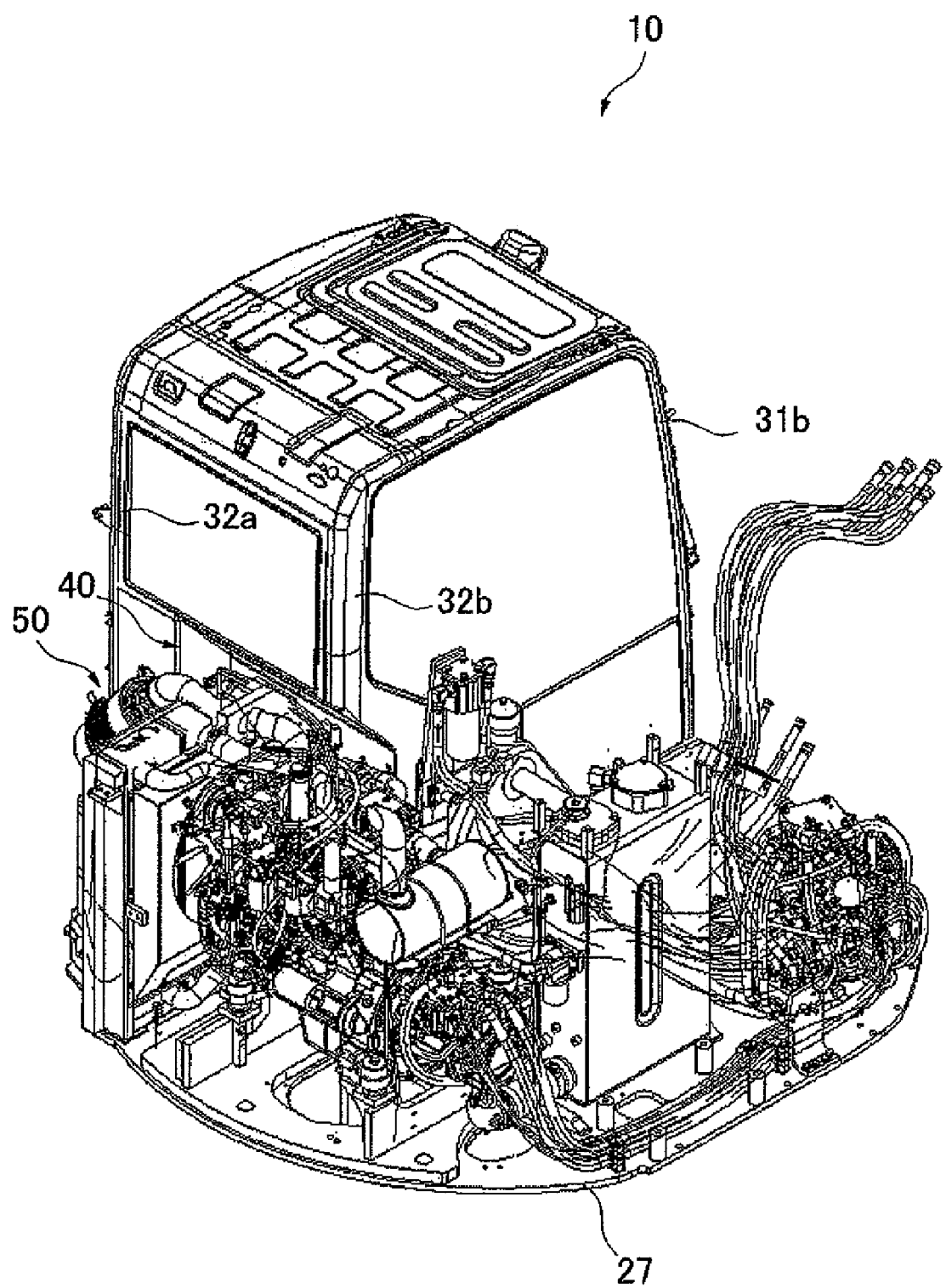
FIG. 13 is a perspective view showing the state of the cab shown in FIG. 3 that is installed on the revolving base.

Accordingly, even if the strength of the cab 10 may be largely reduced caused by the rear-right pole member 32b with a length shorter than other pole members 31a, 31b and 32a that reach the level of the floor frame 27a, the strength is reinforced by the first rear panel portion 41 and the plate-shaped member 42 that are joined to the lower end of the rear-right pole member 32b. Therefore, it is possible to maintain the rigidity of the cab 10. Consequently, as shown in FIGS. 12 and 13, even in the case where the recessed space 40 is formed in the rear side of the cab 10 to provide accommodation space for the cooling device 50 such as a radiator, it is possible to maintain the rigidity of the cab 10.

Features of Cab Structure Unit 20 of Hydraulic Excavator 1

(1) As shown in FIGS. 10 and 11, the cab structure unit 20 of the hydraulic excavator 1 according to this embodiment includes the rear-right pole member 32b that has a length is shorter than other pole member (rear-left pole member 32a), and does not reach the level of the floor frame 27a so that the recessed space 40 is formed in the rear side of the cab 10. The rear-right pole member 32b is joined to the first rear panel portion 41 and the plate-shaped member 42 as a reinforcement member that reinforces a part from the lower end of the rear-right pole member 32b to the height position of the floor frame 27a.

Thus, the recessed space 40 is formed to accommodate the cooling device 50 such as a radiator, and the like in the rear side of the cab 10. Therefore, even in the case where the pole member (rear-right pole member 32b) that is arranged above the recessed space 40 does not reach the height of the floor frame 27a, it is possible to prevent large reduction of the rigidity of the cab 10 as a whole. Consequently, it is possible to provide the cab structure unit 20 that can maintain the rigidity of the cab structure unit 20, and can save space without reducing the interior space of the cab 10.

(2) In the cab structure unit 20 of the hydraulic excavator 1 according to this embodiment, as shown in FIG. 11, the first rear panel portion 41 and the plate-shaped member 42 that are used as a reinforcement member are formed of a sheet metal member.

Thus, the sheet metal member can be formed in desired shapes in accordance with the space in the rear side of the cab 10. Also, the first rear panel portion 41 and the plate-shaped member 42 can be used as a reinforcement member with desired strength by adjusting the thickness of the sheet metal member.

(3) In the cab structure unit 20 of the hydraulic excavator 1 according to this embodiment, as shown in FIG. 11, the first rear panel portion 41 as one of the reinforcement members is provided with the recessed space 40 that is recessed inward of the cab 10.

Since the first rear panel portion 41 is thus formed to provide the recessed space 40 with a desired size, the space in the rear side of the cab 10 that is installed on the revolving base 3 can be used as a place for the cooling device 50 such as a radiator. Consequently, it is possible to reduce the ratio of the area on the upper surface of the revolving base 3 that is occupied by the cab 10, and to provide the cab 10 that can save space.

(4) In the cab structure unit 20 of the hydraulic excavator 1 according to this embodiment, the front-left and front-right pole members 31a and 31b, and the rear-left and rear-right pole members 32a and 32b are coupled to the mount portions 24 through the floor frame 27a, the floor panel 27 and the vibration isolators 24a.

Accordingly, since a load that is applied to the pole members 31a to 32b can be supported at the positions of the mount portions 24 as joint parts between the revolving base 3 and the cab 10, it is possible to provide the cab 10 with higher rigidity.

(5) In the cab structure unit 20 of the hydraulic excavator 1 according to this embodiment, the front-left and front-right pole members 31a and 31b, and the rear-left and the rear-right pole members 32a and 32b are composed of a pipe member.

Accordingly, for example, as compared with pole members that are composed of combined sheet metal members, it is possible to largely improve the rigidity of the cab 10.

Second Embodiment

With reference to FIGS. 1, 2, 5 and 14 through 18, the following description will describe a hydraulic excavator (construction machine) 1 that includes an operator compartment (cab) to which a cab structure for a construction machine according to another embodiment of the present invention is adopted.

Note that components that have the same functions as the components described in the foregoing first embodiment are attached with the same reference numerals and their description is omitted. In addition to this, directions in this embodiment should be also interpreted similarly to those in the foregoing first embodiment.

As shown in FIG. 5, the cab 10 according to this embodiment is installed on four mount portions 24 that are formed in the front-left side of the turning frame 25 as the upper portion of the turning base 3 with vibration isolators 24a and a floor panel 27 being fastened on a floor frame 27a of the cab 10 by bolts (not shown). Thus, the cab 10 is fixedly supported on the revolving base 3 (revolving frame 25) at the four points.

The cab structure of the cab 10 will be described.

Configuration of Cab 10

Figure 14:
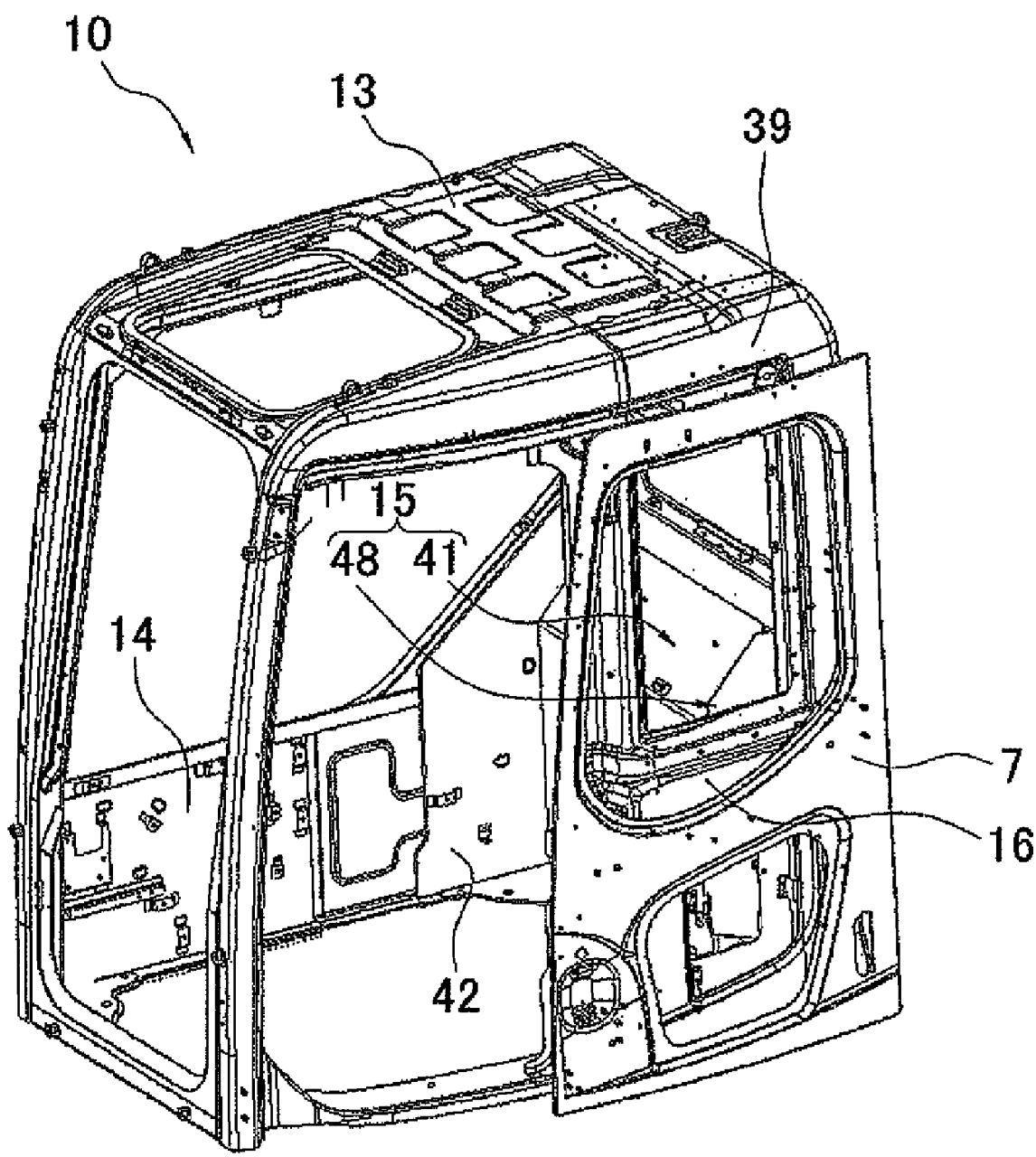
FIG. 14 is a perspective view showing the outline of the cab.

As shown in FIG. 14, the cab 10 is a box-shaped structure portion that is provided with space for the operator formed inside the structure portion. A seat on which the driver sits, a handle and a pedal for operation, and various types of meters (not shown) are disposed inside the cab 10.

As shown in FIG. 2, a central part M of the side portion on the left side of the cab 10 has a curved shape (hereinafter, referred to as an arc part) that bulges outward to extend substantially along a circle with a radius R that centers the revolving center O of the revolving base 3. Accordingly, the hydraulic excavator 1 can be a small rear-swing radius type hydraulic excavator that includes the revolving base 3 is prevented from protruding outward of the lower traveling unit 2 even in revolving operation, and therefore the hydraulic excavator 1 can be operated even in narrow space in the case of roadwork or the like. In addition, the slide door 7 is mounted on the arc part so that the operator steps into/off the cab 10. Thus, even when the slide door 7 is opened, the slide door 7 can be prevented from protruding outward of the revolving radius R of the revolving base 3. Consequently, it is possible to maximize the interior capacity of the cab 10 without interference of the cab 10 that protrudes from the machine body width B (see FIG. 2) with a fixed structure or the like in proximity to the cab 10.

As shown in FIG. 14, the cab 10 includes a frame member 11 (see FIG. 15), the side beam member 34 (see FIG. 15), a plurality of panel members 13 to 16, the slide door 7, and the like.

Frame Member 11

Figure 15:
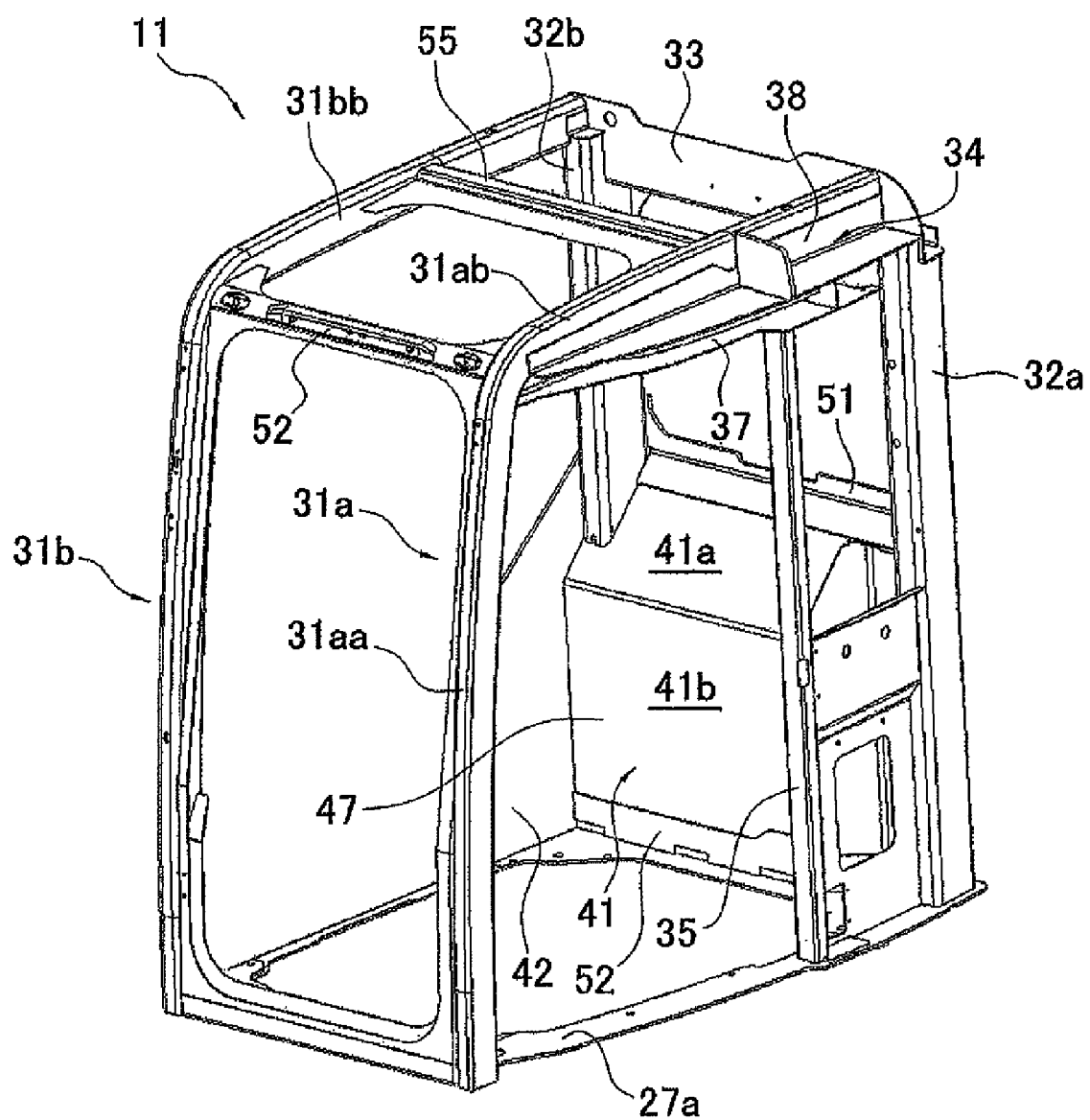
FIG. 15 is a perspective view showing the outline of a frame member.
Figure 16:
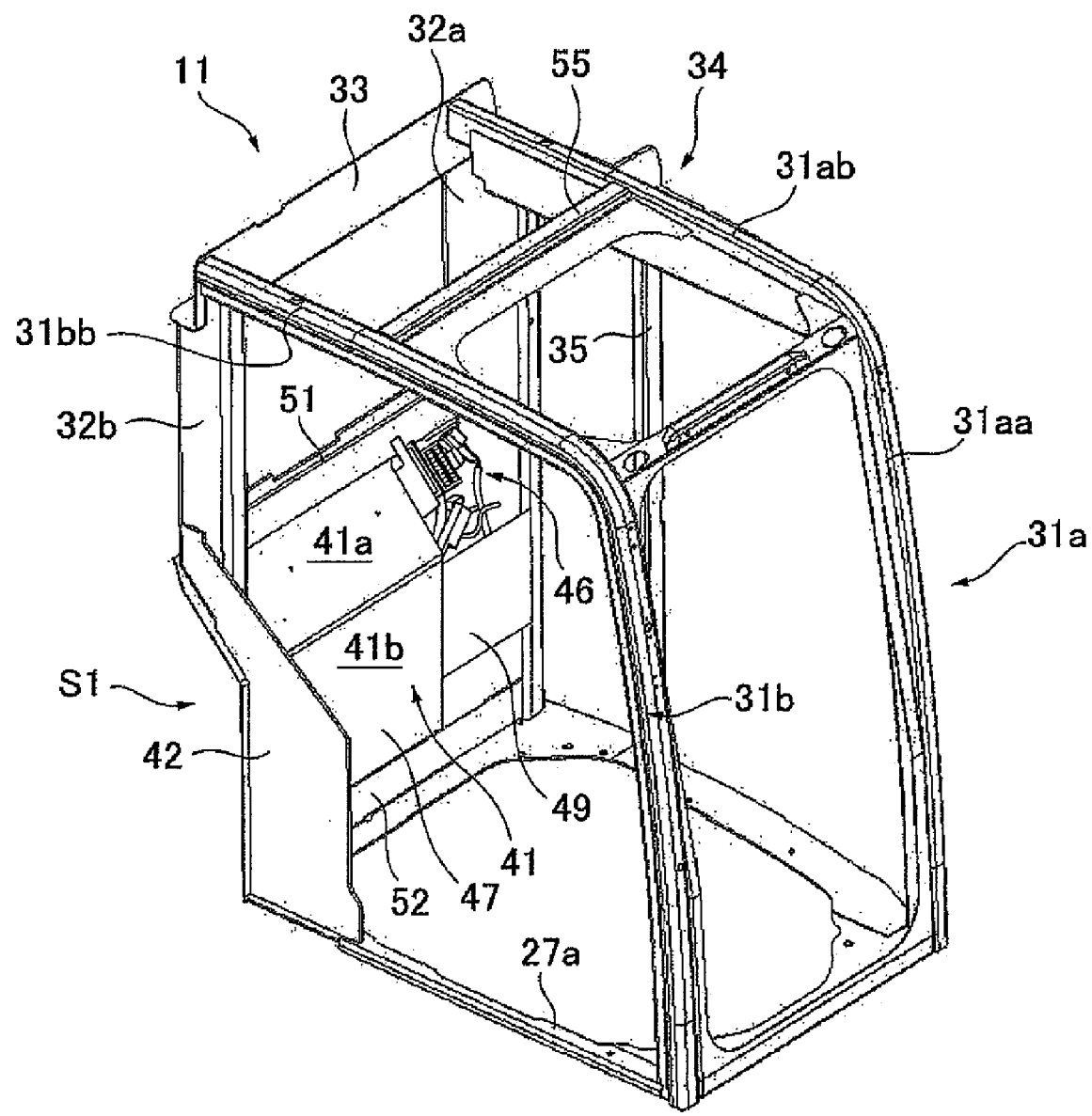
FIG. 16 is a perspective view showing the outline of the frame member.

As shown in FIGS. 15 and 16, the frame member 11 is a framework portion of the cab 10 that is composed of a plurality of pipe-shaped members and sheet metal members in combination with each other. Compartment space is formed inside of the frame member 11 to accommodate the operator. Specifically, the frame member 11 includes the floor frame 27a, the front-left pole member 31a, the front-right pole member 31b, the rear-left pole member 32a (second pole member), the rear-right pole member 32b (first pole member), the rear beam member 33, a middle beam member 55, the support pole member 35, an upper bar member 51 (bar member), and a lower bar member 52. In addition, FIGS. 15 and 16 are external perspective views showing the frame member 11 with the plurality of panel members 13 to 16, the slide door 7 and the like being removed from the cab 10 shown in FIG. 14.

The floor frame 27a is a plate-shaped member that is arranged in the bottom surface of the frame member 11. The floor frame 27a has a substantially rectangular in outline, and has a large opening in the middle of the floor frame 27a. Also, the floor frame 27a has plate-shaped portions that are arranged along the periphery of the opening. The pipe-shaped members (discussed later) are arranged in an upright position on the plate-shaped portions. Also, a protruding portion 43 is arranged in the rear-left part of the floor frame 27a to protrude rearward (toward the exterior side of the compartment space of the cab 10, see FIG. 17). Thus, the rear end of the floor frame 27a is formed in a stepped shape so that the left side of the rear end extends rearward relative to the right side of the rear end. In other words, a recessed portion 44 is arranged in the rear-right of the floor frame 27a to be recessed frontward (toward the compartment space of the cab 10).

The front-left pole member 31a is composed of one pipe-shape member that is bent in proximity to the middle part of the pipe-shaped member, and includes the pole portion 31aa that is substantially arranged along the vertical direction, and the beam portion 31ab that is substantially arranged in the horizontal direction along the front-and-rear direction. The front end of the beam portion 31ab is connected to upper end of the pole portion 31aa. The pole portion 31aa is arranged in an upright position on the floor frame 27a, and is slightly inclined so that the upper part of the pole portion 31aa is positioned rearward. Since one pipe-shaped member is thus bent to form the pole portion 31aa and the beam portion 31ab, it is possible to reduce the number of parts and additionally to provide the frame member 11 with high rigidity. Note that the front-right pole member 31b is similarly configured.

The rear-left pole member 32a is configured of one straight pipe-shaped member, and is arranged substantially in the vertical direction along the left edge of the rear side. Also, a cut-off portion is formed at the upper end of the rear-left pole member 32a to fit with the shape of the rear beam member 33 to be joined to the rear-left pole member 32a. The cut-off portion is joined to the side surface of the rear beam member 33. Also, the lower end of the rear-left pole member 32a is mounted to the protruding portion 43 of the floor frame 27a (see FIG. 17). The rear-left pole member 32a is arranged in an upright position on the floor frame 27a, similarly to the pole portion 31aa. More specifically, the lower end of the rear-left pole member 32a is mounted to the protruding portion 43 along the left end part of the protruding portion 43. Also, the floor frame 27a is mounted at parts that are located substantially right above the aforementioned mount portions 24 together with the floor panel 27 to interpose the vibration isolators 24a between the floor frame 27a and the mount portions 24 (see FIG. 5).

The rear-right pole member 32b is also configured of one straight pipe-shaped member similarly to the rear-left pole member 32a, and is arranged substantially in the vertical direction along the right edge of the rear side. Similarly to the rear-left pole member 32a, a cut-off portion is also formed at the upper end of the rear-right pole member 32b to fit with the shape of the rear beam member 33 to be joined to the rear-right pole member 32b, and the cut-off portion is also joined to the side surface of the rear beam member 33. Note that although the rear-right pole member 32b is arranged in the position same as the rear-left pole member 32a in the front-and-rear direction as viewed laterally to overlap the rear-left pole member 32a, the lower end of the rear-right pole member 32b does not reach the level (height position) of the floor frame 27a but is joined to the upper part of the first rear panel portion 41 the lower part of which is bent inward. Thus, recessed space (hereafter referred to as the "outside accommodation space S1") is formed on the rear side of the first rear panel portion 41 to be recessed inward of the cab 10.

The rear beam member 33 is composed of a sheet metal member that has a substantially L shape in section. The rear beam member 33 couples the rear end of the beam portion 31ab of the front-left pole member 31a, and the upper end of the rear-left pole member 32a to each other. Also, the rear beam member 33 couples the rear end of the beam portion 31bb of the front-right pole member 31b, and the upper end of the rear-right pole member 32b to each other. More specifically, the rear end portion of beam portion 31ab of the front-left pole member 31a is joined to the surface of the substantially sectionally L-shaped rear beam member 33 that is substantially parallel to the vertical direction. The upper end of the rear-left pole member 32a is joined to the surface of the substantially sectionally L-shaped rear beam member 33 that is substantially parallel to the horizontal direction. The same goes for the beam portion 31bb of the front-right pole member 31b, and the rear-right pole member 32b.

The middle beam member 55 is composed of one straight sheet metal member, and is substantially arranged along the horizontal direction. One end of the middle beam member 55 is fastened to the inside surface of the beam portion 31ab of the front-left pole member 31a, and the other end is fastened to the inside surface of the beam portion 31bb of the front-right pole member 31b.

The support pole member 35 is a straight pipe-shaped member that is arranged along the vertical direction. The support pole member 35 is arranged at the rear side of the pole portion 31aa and at the front side of the rear-left pole member 32a, and is arranged at the intermediate position between the pole portion 31aa and the rear-left pole member 32a. Note that, as discussed above, since the left side surface of the cab 10 has a bulging shape, the support pole member 35 is positioned outward of a position right behind the pole portion 31aa and outward of a position right under the beam portion 31ab. Also, the lower end of the support pole member 35 is fastened to the floor frame 27a, and the support pole member 35 is arranged in an upright position on the floor frame 27a. The upper end of the support pole member 35 is fastened to the lower surface of a first support member 37 (discussed later). The support pole member 35 can improve the rigidity of the cab 10, and additionally can keep the balance of the cab 10 even when the slide door 7 that is attached to the left side surface of the cab 10 slides.

Figure 17:
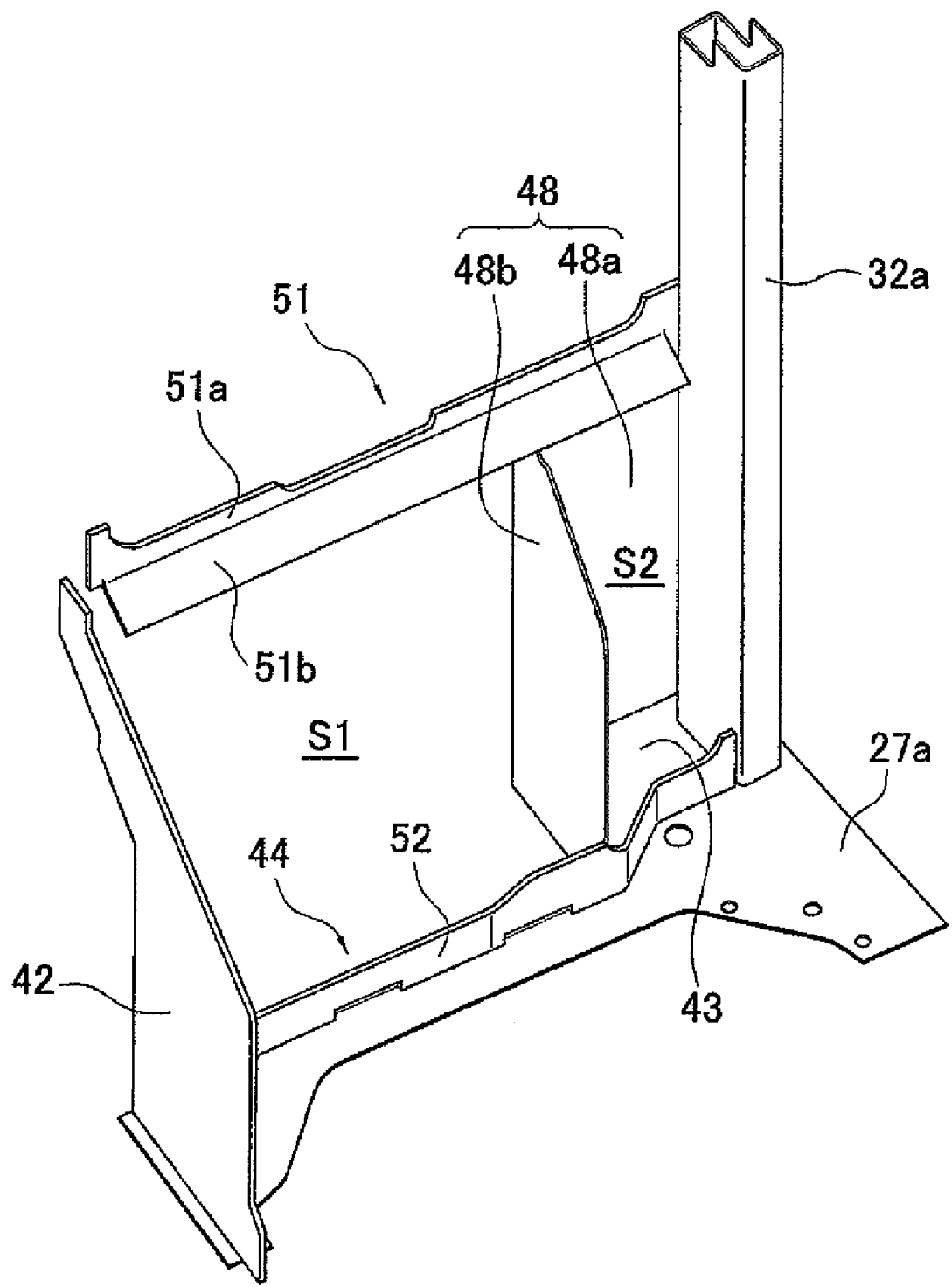
FIG. 17 is a view showing the configuration of a part in proximity to inside accommodation space and outside accommodation space.
Figure 18:
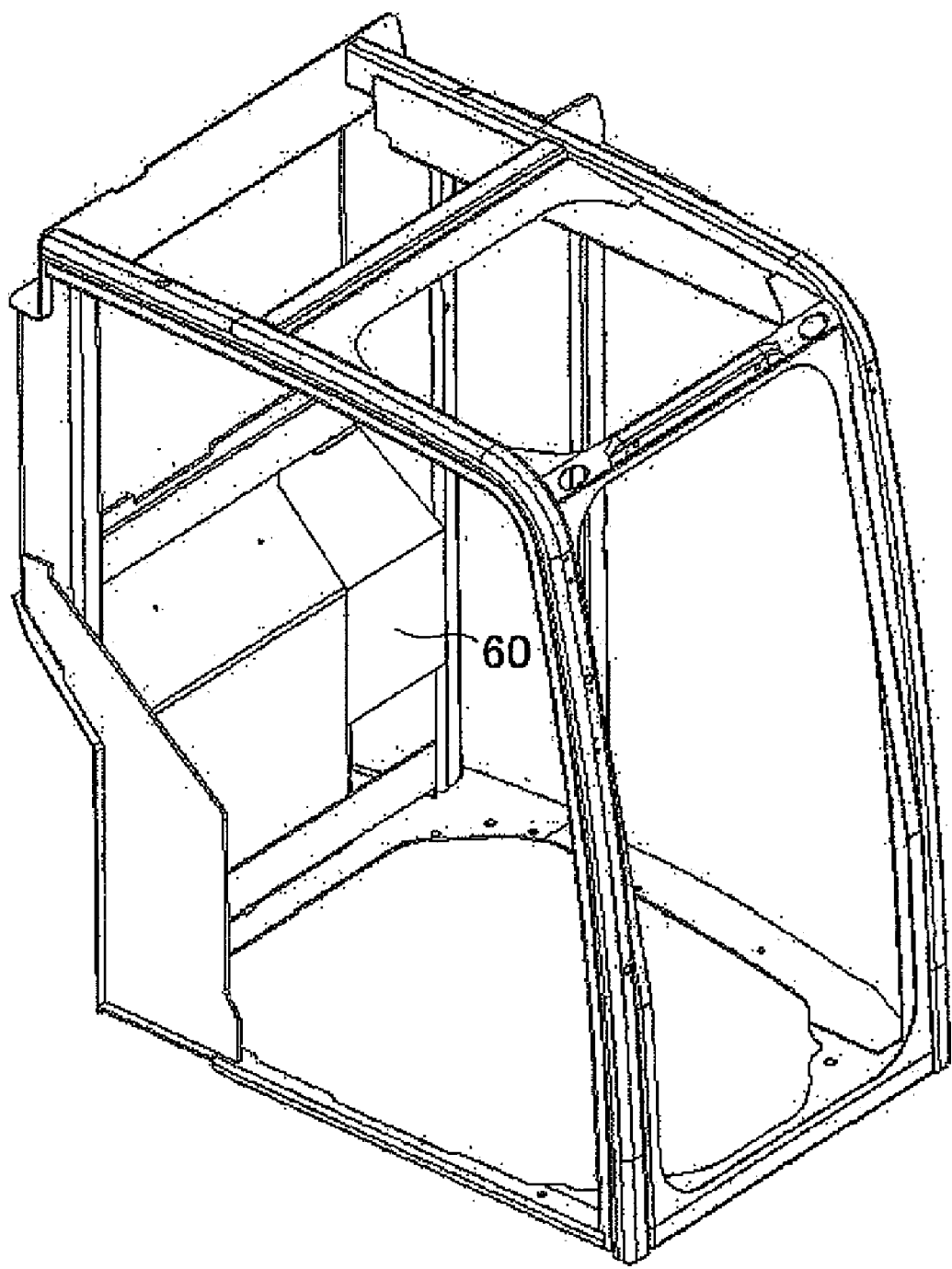
FIG. 18 is a view showing a cover according to another embodiment.

The upper bar member 51 is arranged along the horizontal direction in the rear side of the frame member 11. Also, the upper bar member 51 is arranged between the floor frame 27a and the rear beam member 33 in the vertical direction. The upper bar member 51 couples the rear-left pole member 32a and the rear-right pole member 32b to each other. One end of the upper bar member 51 is joined to the middle in the vertical direction of the rear-left pole member 32a, and the other end is joined to the near-lower end of the rear-right pole member 32b. As shown in FIG. 17, the upper bar member 51 is composed of a sheet metal member that is bent at the middle in the vertical direction, and includes a vertical surface portion 51a and an inclined surface portion 51b. The vertical surface portion 51a is arranged in parallel to the vertical direction. The both ends of the vertical surface portion 51a are joined to the rear surfaces of the rear-left pole member 32a and the rear-right pole member 32b. The upper edge of the inclined surface portion 51b is integrally connected to the lower edge of the vertical surface portion 51a, and is inclined so that the lower edge is positioned frontward. The inclined surface portion 51b is slightly shorter than the vertical surface portion 51a in the horizontal direction, and is located between the inside surfaces of the rear-left pole member 32a and the rear-right pole member 32b.

The lower bar member 52 is a sheet metal member that is arranged in an upright position in proximity to the rear end of the floor frame 27a, and has a very small height as compared with the rear-left pole member 32a and the first rear panel portion 41 (discussed later). The lower bar member 52 is arranged along the recessed portion 44 in the rear end right side of the floor frame 27a, and extends across the protruding portion 43 to be connected to the near-lower end of the rear-left pole member 32a. In addition, the right end of the lower bar member 52 is joined to the plate-shaped member 42 for reinforcement of the right side surface (discussed later).

Side Beam Member 34

As shown in FIG. 15, the side beam member 34 is mounted to the upper part of the left side surface of the cab 10 including the aforementioned arc part along the beam portion 31ab of the front-left pole member 31a. The side beam member 34 couples the beam portion 31ab of the front-left pole member 31a and the rear-left pole member 32a to each other, and is fastened to the upper end of the support pole member 35. The side beam member 34 is arranged along and above a range where the slide door 7 slides, and is provided with a guide portion (not shown) that guides the slide door 7. The first support member 37 and the second support member 38 that have an L shape in section are combined with each other to compose the side beam member 34.

Entire Configuration of Panel Members 13 to 16

The plurality of panel members 13 to 16 shown in FIG. 14 are mounted to the aforementioned frame member 11 to cover the frame member 11, and are formed of a sheet metal member that is subjected to presswork and the like. In addition to the plurality of panel members 13 to 16 of side panels 14 and 16, an upper surface panel 13 and rear side panel 15, the plate-shaped member 42 for reinforcement of the right side surface 42 or the like is included. The glass window (not shown) is fitted into openings that are formed in the panel members 13 to 16. In addition, since the aforementioned arc shape that lies on the left side surface of the cab 10 is composed of the side panel 16 that is mounted to the left side surface of the cab 10, and the side frame 39 that is mounted to the side beam member 34 to cover the exterior side of the side beam member 34, the side panel 16 and the side frame 39 have an approximately arc shape that centers the revolving center O. Note that the slide door 7 is mounted on the left side surface of the frame member 11, and opens/closes the entrance opening that is formed between the pole portion 31aa and the support pole member 35.

Also, as shown in FIG. 16, the recessed outside accommodation space S1 is formed in the rear side of this cab 10 to be recessed inward of the cab 10. The outside accommodation space S1 communicates to the exterior of the cab 10, and accommodates the cooling device such as a radiator that is arranged on the revolving base 3 (revolving frame 25). Since the shape of the cab 10 is not a perfect rectangular parallelepiped shape, but partially has the outside accommodation space S1, the occupancy area of the cab 10 on the revolving base 3 is reduced so that the space on the revolving base 3 can be effectively used. Additionally, it is possible to reduce the revolving base 3 in size. Also, the outside accommodation space S1 is located in a part of the lower section of the rear side on the right side of the cab 10, and the other part of the lower section of the rear side on left side of the cab 10 is coplanar with the upper section of the rear side on left side of the cab 10. That is, the part of the lower section of the rear side on left side of the cab 10 protrudes rearward relative to the part of the lower section of the rear side on the right side of the cab 10. The interior space of the part of the lower section of the rear side on left side of the cab 10 serves as an inside accommodation space S2 that communicates to the compartment space and accommodates electrical devices 46.

The following description will describe the rear side panel 15 that forms the outside accommodation space S1 and the inside accommodation space S2, and the plate-shaped member 42 for reinforcement of the right side surface.

Rear Side Panel 15

The rear side panel 15 is a plate-shaped member that covers the lower section of the rear side of the frame member 11. The rear side panel 15 covers substantially the lower half of the rear side of the frame member 11. An approximately two-thirds part of the rear side panel 15 on the right side is recessed forward. The other part of the rear side panel 15 on the left side protrudes rearward relative to the right part. Also, the upper end of the rear side panel 15 is joined to the upper bar member 51, and the lower end of the rear side panel 15 is joined to the floor frame 27a through the lower bar member 52. The rear side panel 15 has the first rear panel portion 41 (see FIGS. 15 and 16) and a second rear panel portion 48 (see FIG. 17).

The first rear panel portion 41 (outside accommodation space formation portion) is a member that forms the outside accommodation space S1, and is composed of a bent sheet metal member. The first rear panel portion 41 is arranged in the rear side of the frame member 11 to be laterally spaced at a spacing away from the rear-left pole member 32a. The second rear panel portion 48 is arranged between the first rear panel portion 41 and the rear-left pole member 32a. The first rear panel portion 41 is arranged in the lower section of the rear side of the frame member 11 from the right end of the second rear panel portion 48 to the rear-right pole member 32b. Also, the first rear panel portion 41 is bent at a predetermined angle in the middle of the first rear panel portion 41 in the vertical direction. The upper section 41a of the first rear panel portion 41 is inclined similarly to the inclined surface portion 51b of the upper bar member 51. The upper end of the upper section 41a is joined to the inclined surface portion 51b. The lower section 41b of the first rear panel portion 41 is arranged substantially along the vertical direction, and is position forward of the upper section of the rear side of the frame member 11. Also, the lower end of the first rear panel portion 41 is joined to the floor frame 27a through the lower bar member 52. Thus, the first rear panel portion 41 is bent so that the lower section 41b protrudes frontward of the lower end of the upper section of the rear side of the frame member 11, i.e., the upper bar member 51, thereby forming the outside accommodation space S1 in the lower section of the rear side of the frame member 11.

As shown in FIG. 17, the second rear panel portion 48 (inside accommodation space formation portion) is a member that forms the inside accommodation space S2 between the outside accommodation space S1 and the rear-left pole member 32a, and is composed of a bent sheet metal member. Note that FIG. 17 shows the structure in proximity to the inside accommodation space S2 and the outside accommodation space S1 with some components being removed for sake of clarity. One side end of the second rear panel portion 48 is joined to the rear-left pole member 32a, and the other side end is joined to the first rear panel portion 41. Also, the upper end of the second rear panel portion 48 is joined to the upper bar member 51, and the lower end is joined to the floor frame 27a. The second rear panel portion 48 includes a rear plate-shaped section 48a and a side plate-shaped section 48b.

The rear plate-shaped section 48a is arranged in an upright position on the floor frame 27a to cover the rear of the inside accommodation space S2. More specifically, the rear plate-shaped section 48a is arranged along the rear end of the protruding portion 43 of the floor frame 27a, and is positioned slightly rearward relative to the rear-left pole member 32a. The rear plate-shaped section 48a is arranged substantially along the vertical direction. The upper end of the rear plate-shaped section 48a is joined to the upper bar member 51. Also, the left end of the rear plate-shaped section 48a is joined to the rear surface of the rear-left pole member 32a. Also, the right end of the rear plate-shaped section 48a is integrally connected to the rear end of the side plate-shaped section 48b.

The side plate-shaped section 48a is arranged in an upright position on the floor frame 27a, and is connected to the rear plate-shaped section 48a at a right angle to serve as a partition between the inside accommodation space S2 and the outside accommodation space S1. The side plate-shaped section 48b is arranged along the right end of the protruding portion 43 of the floor frame 27a, and is opposed to the rear-left pole member 32a to interpose the inside accommodation space S2 between the side plate-shaped section 48b and the rear-left pole member 32a. Also, the side plate-shaped section 48b is arranged substantially in the vertical direction. The upper end of the side plate-shaped section 48b is formed in a shape that matches the inclination of an upper section 47a of the first rear panel portion 41, and is joined to the upper section 47a of the first rear panel portion 41. Also, the front end of the side plate-shaped section 48b is joined to a lower section 47b of the first rear panel portion 41.

Thus, the bottom, rear and both sides of the inside accommodation space S2 are covered by the protruding portion 43 of the floor frame 27a, the rear-left pole member 32a, and the second rear panel portion 48 so that the inside accommodation space S2 is formed to protrude rearward of the compartment space. As shown in FIG. 16, the electrical devices 46 are accommodated in the inside accommodation space S2. Examples of the electrical devices 46 are provided by a control computer for the driving system of the hydraulic excavator, a control computer for a air-conditioner, fuses, a communication device. A plurality of the electrical devices 46 are assembled as a unit.

Also, the outside accommodation space S1 is formed on the exterior side of the cab 10 at the side of the inside accommodation space S2 by the first rear panel portion 41 and the side plate-shaped section 48b of the second rear panel portion

48. Some devices such as a radiator that are arranged at the rear side of the cab 10 are accommodated in the outside accommodation space S1.

Also, a cover member 49 is mounted on the front of the rear-left pole member 32a and the front end of the side plate-shaped section 48b to close the front of the inside accommodation space S2. The cover member 49 is arranged over the front of the rear-left pole member 32a and the side plate-shaped section 48b. The cover member 49 is detachably or openably mounted to the rear-left pole member 32a and the side plate-shaped section 48b.

Right Side Surface Reinforcement Plate-Shaped Member 42

The right side surface reinforcement plate-shaped member 42 is a sheet metal member that is arranged along the right side surface of the cab 10 to reinforce the joint part in proximity to the rear-right pole member 32b. The right side surface reinforcement plate-shaped member 42 couples the rear-right pole member 32b, the rear side panel 15, and the floor frame 27a to each other. The upper end of the right side surface reinforcement plate-shaped member 42 is joined to the outside surface of the rear-right pole member 32b, and the lower end is joined to the floor frame 27a. The rear end of the right side surface reinforcement plate-shaped member 42 is formed in a shape that matches the bent shape of the first rear panel portion 41, and is joined to the right end of the first rear panel portion 41. Note that the first rear panel portion 41 and the right side surface reinforcement plate-shaped member 42 are mounted to intersect each other.

Features (1) In this cab structure for a construction machine, the inside accommodation space S2 is formed at the side of the rear-right pole member 32a, and the outside accommodation space S1 is formed at the side of the inside accommodation space S2. Since the inside accommodation space S2 communicates to the compartment space and is protected from the outside, the inside accommodation space S2 is suitable to accommodate devices that is necessarily protected from wind and weather, and dust. Also, since the outside accommodation space S1 is formed in the lower part of the rear side of the frame member 11 to be recessed frontward, the outside accommodation space S1 is suitable to accommodate devices that are arranged outside the cab 10. This configuration allows the inside accommodation space S2 to accommodate electrical devices 46 that are necessarily protected from wind, weather and the like, and allows the out accommodation space S1 to accommodate devices such as a radiator that are relatively less necessarily protected from wind, weather and the like, therefore, devices can be appropriately accommodated in limited space.

Also, since the inside accommodation space S2 protrudes rearward of the compartment space, the accommodated electrical devices 46 do not interfere with the operator. Therefore, it is possible to wide compartment space.

(2) In this cab structure for a construction machine, the second rear panel portion 48 that forms the inside accommodation space S2 has the rear plate-shaped section 48a and the side plate-shaped section 48b that are connected to each other at a right angle, and has an outline that is bent at 90 degrees. Also, the second rear panel portion 48 is arranged in an upright position on the floor frame 27a, and is joined to the rear-left pole member 32a and the upper bar member 51. Accordingly, the second rear panel portion 48 can support a load that is laterally applied to the rear-left pole member 32a. That is, the second rear panel portion 48 is a dividing member that divides the outside accommodation space S1 and the inside accommodation space S2 from each other, and additionally serves a reinforcement member that reinforces the rear-left pole member 32a. Therefore, it is possible to ensure the rigidity of the cab 10.

(3) In this cab structure for a construction machine, the cover member 49 is arranged from the rear-left pole member 32a to the side plate-shaped section 48b to close the inside accommodation space S2 from the compartment space side. Accordingly, the cover member 49 can also support a load that is laterally applied to the rear-left pole member 32a. Therefore, it is possible to ensure the higher rigidity of the cab 10.

Other Embodiments

The foregoing description has described one embodiment according to the present invention. However, the present invention is not limited to the foregoing embodiment. Various changes and modifications can be made without departing from the spirit of the present invention.

(A) In the foregoing first embodiment, the first rear panel portion 41 and the plate-shaped member 42 has been illustratively described to be used as a reinforcement member that reinforces the strength of a part in proximity to the rear-right pole member 32b the length of which does not reach the floor frame 27a. However, the present invention is not limited to this.

For example, the first rear panel portion 41 may be formed of a thin sheet metal member, and the plate-shaped member 42 may be formed of a thick sheet metal member so that only the plate-shaped member 42 is used as a reinforcement member. In the case where sheet metal members with different thickness are thus used, one member can be used as a reinforcement member.

(B) In the foregoing first embodiment, the small rear-swing radius type hydraulic excavator has been illustratively described as a construction machine to which the present invention is adopted. However, the present invention is not limited to this.

For example, the present invention can be also applied to typical hydraulic excavators other than a small rear-swing radius type hydraulic excavator. In this case, recessed space or the like that is formed in a part of a cab also reduce the ratio of the occupancy area of the cab on a revolving base. Therefore, the space above the revolving base can be also effectively used.

(C) In the foregoing first embodiment, the floor frame 27a that is positioned under the cab structure unit 20 has been described as a separate member from the floor panel 27. However, the present invention is not limited to this.

For example, the floor frame 27a may be formed integrally with the floor panel 27. That is, the front-left and front-right pole members 31a and 31b, and the rear-left pole member 32b may be coupled directly to the floor panel 27.

Also, the cab structure unit 20 may be installed on the revolving base 3 without using the vibration isolators 24a.

(D) In the foregoing first embodiment, only one member, the rear-right pole member 32b of the pole members has been illustratively descried as a pole member the length of which does not reach the floor frame 27a. However, the present invention is not limited to this.

For example, other pole member, e.g., as the rear-left pole member 32a, may be a pole member the length of which does not reach the floor frame 27a. In this case, a reinforcement member that is mounted between the short pole member and the floor frame 27a can also maintain the rigidity of the cab 10 (cab structure unit 20) similarly to the foregoing embodiment.

However, in consideration of the rigidity of the cab 10, the number of short pole members is preferably as small as possible. For this reason, as in the foregoing first embodiment, it is more preferable that only one pole member is a short pole member that does not reach the floor frame 27a.

(E) In the foregoing first embodiment, the front-left, front-right pole members 31a and 31b, and the rear-left and rear-right pole members 32a and 32b have been illustratively described to be composed of a pipe member. However, the present invention is not limited to this.

For example, of the pole members that are arranged at the four corners of the cab structure unit 20, one to three pole members may be composed of a pipe member. In this case, as compared with pole members that are composed of combined sheet metal members, it is possible to provide an effect that largely improves the rigidity of the cab 10.

(F) In the foregoing first embodiment, the hydraulic excavator 1 has been illustratively described as a construction machine to which the cab structure according to one embodiment of the present invention is adopted. However, the present invention is not limited to this.

For example, the present invention can be similarly applied to another type of construction machine that includes a revolving base that is provided with a cab.

(G) In the foregoing second embodiment, although the cover member 49 covers the front of the inside accommodation space S2, the cover member is not limited to cover the front of the inside accommodation space S2. The upper part of the inside accommodation space S2 may also be covered by a cover member 60 shown in FIG. 18.

(H) In the foregoing second embodiment, although the second rear panel portion 48 is bent at approximately 90 degrees, the second rear panel portion may be bent at an angle other than 90 degrees. Also, the second rear panel portion is not limited to be bent at a certain angle. The second rear panel portion may be curved. In this case, it is also possible to ensure the rigidity of the cab 10, similarly to the foregoing second embodiment.

Also, the first rear panel portion 41 is not limited to be bent at a certain angle. The first rear panel portion 41 may be curved.

A cab structure according to the present invention, even in the case where a plurality of pole members that compose the cab structure include a pole member that does not reach the floor frame, can provide an effect that ensures the rigidity of cab structure. Accordingly, the cab structure according to the present invention can be widely applied to operator compartments of working machines such as construction machines and agricultural machines.

The invention claimed is:

1. A cab structure for a construction machine that is arranged on an upper revolving unit that is mounted to a traveling unit, the cab structure for a construction machine comprising:
   first, second, third and fourth pole members that are respectively disposed at four corners of the cab structure and substantially arranged along a vertical direction with the first and second pole members being disposed in a rear end of the cab structure;
   a floor frame that is substantially arranged along a horizontal plane to form a part of a floor; and
   a reinforcement member that couples a lower end of the first pole member to the floor frame so that the lower end of the first pole member is vertically spaced apart from said floor frame by the reinforce member, the reinforcement member including a rear plate-shaped member arranged generally along a rear face of the cab structure and a side plate-shaped member arranged generally along a side face of the cab structure with the rear plate-shaped member and the side plate-shaped member being joined together,
   the floor frame being coupled with lower end portions of the second, third and fourth pole members and the reinforcement member at positions disposed along the horizontal plane.

2. The cab structure for a construction machine set forth in claim 1, wherein
   said reinforcement member is a sheet metal member.

3. The cab structure for a construction machine set forth in claim 1, wherein
   said reinforcement member is arranged in a rear side of the cab structure and has a recessed portion that is recessed inward.

4. The cab structure for a construction machine set forth in claim 1, wherein
   at least one of the first to fourth pole members includes a pipe member.

5. A cab structure for a construction machine that is arranged on an upper revolving unit that is mounted to a traveling unit, the cab structure for a construction machine comprising:
   a plurality of pole members that are substantially arranged along a vertical direction;
   a floor frame that is substantially arranged along a horizontal plane to form a part of a floor;
   a plurality of mount portions disposed along the horizontal plane and coupled to the floor frame;
   a reinforcement member that couples a lower end of a first pole member included in said plurality of pole members to one of the mount portions so that the first pole member is vertically spaced apart from said floor frame;
   a frame member that includes said floor frame and a second pole member that is arranged in an upright position on said floor frame, and forms compartment space where an operator is accommodated inside the frame member;
   an outside accommodation space formation portion that is laterally spaced away from said second pole member and is arranged in a rear side of said frame member, the outside accommodation space formation portion having a bent shape in that a lower section of the outside accommodation space formation portion is recessed frontward from the rear side of said frame member so that outside accommodation space is formed in a lower part of the rear side of said frame member; and
   an inside accommodation space formation portion that forms inside accommodation space that is arranged between said second pole member and said outside accommodation space and communicates to said compartment space, wherein
   said inside accommodation space formation portion includes
      a rear plate-shaped section that is arranged in an upright position on said floor frame and is joined to said second pole member to cover a rear side of said inside accommodation space, and
      a side plate-shaped section that is arranged in an upright position on said floor frame and is connected to said rear plate-shaped section to serve as a partition between said inside accommodation space and said outside accommodation space.

6. The cab structure for a construction machine set forth in claim 5, wherein
said frame member further includes
said first pole member that is arranged along an edge of the rear side of said frame member on the side opposite to the second pole member, and
a bar member that couples said first pole member and said second pole member to each other, wherein
an upper edge portion of said rear plate-shaped section is joined to said bar member.

7. The cab structure for a construction machine set forth in claim 5, further comprising
a cover member that is arranged from said second pole member to said side plate-shaped section to cover a front side of said inside accommodation space.

8. The cab structure for a construction machine set forth in claim 7, further comprising
electrical equipment that is accommodated in said inside accommodation space.

9. A cab structure for a construction machine comprising:
a frame member that includes a floor frame that is arranged as a floor surface, and a plurality of pipe-shaped members that include a first pole member and a second pole member with the second pole member being arranged in an upright position along one side edge of a rear side of the frame member on said floor frame, the frame member forming compartment space where an operator is accommodated inside the frame member;
an outside accommodation space formation portion that is laterally spaced away from said second pole member and is arranged in the rear side of said frame member, the outside accommodation space formation portion having a bent shape in that a lower section of the outside accommodation space formation portion is recessed frontward from the rear side of said frame member so that outside accommodation space is formed in a lower part of the rear side of said frame member, and
an inside accommodation space formation portion that forms inside accommodation space that is arranged between the second pole member and said outside accommodation space and communicates to said compartment space, wherein
said inside accommodation space formation portion includes
a rear plate-shape section that is arranged in an upright position on said floor frame and is joined to said second pole member to cover a rear side of said inside accommodation space, and
a side plate-shaped section that is arranged in an upright position on said floor frame and is connected to said rear plate-shaped section to serve as a partition between said inside accommodation space and said outside accommodation space.

10. The cab structure for a construction machine set forth in claim 9, wherein
said frame member further includes
said first pole member that is arranged along an edge of the rear side of said frame member on a side opposite to the second pole member, and
a bar member that couples said first pole member and said second pole member to each other, wherein
an upper edge portion of said rear plate-shaped section is joined to said bar member.

11. The cab structure for a construction machine set forth in claim 9, further comprising
a cover member that is arranged from said second pole member to said side plate-shaped section to cover a front side of said inside accommodation space.

12. The cab structure for a construction machine set forth in claim 9, further comprising
electrical equipment that is accommodated in said inside accommodation space.

* * * * *